(12) United States Patent
Takayama et al.

(10) Patent No.: US 6,904,135 B2
(45) Date of Patent: Jun. 7, 2005

(54) COMPOUND DEVICE AND TELEPHONE STATION DEVICE CONNECTED TO THE SAME, AND POWER SUPPLY SYSTEM AND PORTABLE TELEPHONE SYSTEM USING COMPOUND DEVICE

(75) Inventors: Shuichi Takayama, Takarazuka (JP); Nobuo Higaki, Kobe (JP); Hajime Ogawa, Kyoto (JP); Taketo Heishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 356 days.

(21) Appl. No.: 10/172,216

(22) Filed: Jun. 14, 2002

(65) Prior Publication Data

US 2002/0191761 A1 Dec. 19, 2002

(30) Foreign Application Priority Data

Jun. 14, 2001 (JP) ........................................ 2001-180440

(51) Int. Cl.⁷ ............................ H04M 11/00; H04B 1/00
(52) U.S. Cl. .............................. 379/110.01; 379/114.12
(58) Field of Search ...................... 379/110.01, 102.03, 379/90.01, 93.17, 114.01, 114.1, 114.12, 121.02; 455/420

(56) References Cited

U.S. PATENT DOCUMENTS 5,729,693 A * 3/1998 Holda-Fleck ............. 379/93.12
5,828,946 A    10/1998 Feisullin et al.
6,463,299 B1 * 10/2002 Macor ..................... 379/110.01
6,690,778 B2 *  2/2004 Kahn ...................... 379/110.01
2001/0043687 A1 * 11/2001 Tidwell et al. ......... 379/110.01
2002/0044199 A1 *  4/2002 Barzebar et al. ....... 379/110.01
2002/0061095 A1 *  5/2002 Beecroft ................. 379/110.01
2002/0101968 A1 *  8/2002 Sano ...................... 379/114.12

FOREIGN PATENT DOCUMENTS

JP       10-117332     5/1998
JP       11-313262    11/1999
JP     2001-136454     5/2001

* cited by examiner

*Primary Examiner*—Stella Woo
(74) *Attorney, Agent, or Firm*—Merchant & Gould P.C.

(57) ABSTRACT

A compound device has the structural hardware of a digital television, is connected to an antenna and a telephone station, and by reading out and running either a digital television (DTV) program or a base station program with a general processor, it has both the function of a digital television and the function of a portable telephone base station. The owner of the compound device receives discounts in their subscribed telephone fee or their power fee based on records in a communication record portion. Thus, a compound device in which a digital television is given the function of a portable telephone base station is provided, so that a novel infrastructure can be achieved in which insufficiencies in base stations are made up for without requiring equipment investment expenditures and portable device owners are given financial benefits in compensation for allowing the public use of their private possession as a portable telephone base station.

56 Claims, 17 Drawing Sheets

COMPOUND DEVICE AND TELEPHONE STATION DEVICE CONNECTED TO THE SAME, AND POWER SUPPLY SYSTEM AND PORTABLE TELEPHONE SYSTEM USING COMPOUND DEVICE

BACKGROUND OF THE INVENTION

1. Field of the Invention

The present invention relates to a compound device in which the function of a portable telephone base station has been incorporated into a consumer information processing device such as a digital television.

2. Description of Related Art

Portable telephones recently have become remarkably widespread. The increasing number of portable telephones, however, requires increased construction of portable telephone base stations (hereinafter, referred to as base stations) for relaying between portable telephones and telephone stations. As shown in FIG. 17, base stations send/receive with a particular portable telephone within the range reached by the electromagnetic waves, and for example send/receive, via cable, information or the like communicated over the portable telephone to and from the telephone station.

Constructing base stations, however, creates problems for telephone companies because an equipment investment of course is required, and the greater the increase in the number of portable telephone subscribers, the larger the burden this equipment investment becomes.

SUMMARY OF THE INVENTION

Accordingly, it is a primary object of the present invention to make up for insufficiencies in portable telephone base stations without increasing the equipment investment burden of the telephone companies by providing a compound device in which a consumer information processing device, such as a digital television, used for example in an ordinary household has been given the function of a potable telephone base station.

A compound device of the present invention for achieving the above object is connected to an antenna device and a communications line in communication with a telephone station, and is provided with a first function portion for receiving and processing electromagnetic waves for a consumer information processing device via the antenna device, and a second function portion for processing as a portable telephone base station via the antenna device and the communications line.

Thus, a compound device purchased as a consumer information processing device and installed in an ordinary home or the like also functions as a base station for portable telephones, so that an insufficiency in base stations for portable telephones can be compensated without increasing the equipment investment burden of telephone companies.

It is preferable that the consumer information processing device is a digital television receiver device or an image processing device for digital television.

It is preferable that in the compound device the antenna device converts electromagnetic waves for digital television into analog signals for digital television, converts electromagnetic waves for portable telephone into analog signals for portable telephone, and converts analog signals for portable telephone into electromagnetic waves for portable telephone. It also is preferable that the compound device is provided with an analog signal processing portion for digital television for inputting analog signals for digital television from the antenna device and converting them into digital data for digital television, an analog signal processing portion for portable telephone base stations for converting analog signals for portable telephones converted by the antenna device into digital data for portable telephones and converting the digital data for portable telephones into analog signals for portable telephones, a digital data processing portion for processing digital data in accordance with a program that has been read out, a digital television program storage portion for storing a program for converting digital data for digital television converted by the analog signal processing portion for digital television into image data and sound data, and a portable telephone program storage portion for storing a program for converting the digital signals for portable telephones converted by the analog signal processing portion for portable telephone base stations into portable telephone communication information and outputting to the communications line, and converting the portable telephone communication information input from the communications line into digital data for portable telephones and outputting to the analog signal processing portion for portable telephone base stations.

This configuration makes it easy to control whether to function as a digital television or as a portable telephone base station by having a selection portion select a program to be read out by the digital data processing portion from either the program stored in the digital television program storage portion or the program stored in the portable telephone program storage portion.

In the compound device, it is preferable that the selection portion selects the program stored in the portable telephone program storage portion as the program to be read out by the digital data processing portion if output from the analog signal processing portion for portable telephone base stations is a valid value.

Thus, the compound device operates as the base station for portable telephones only if it is necessary that the portable telephone communication information is relayed, and at all other times it can operate as a consumer information processing device such as a digital television. Consequently, it is possible to achieve a compound device that functions as a consumer information processing device and functions as a portable telephone base station where necessary.

In the compound device, it is preferable that the digital data processing portion is capable of executing the program stored in the digital television program storage portion and the program stored in the portable telephone program storage portion in parallel.

For example, if the digital data processing device is achieved by a processor capable of executing a plurality of tasks in parallel, then the program stored in the digital television program storage portion and the program stored in the portable telephone program storage portion can be run in parallel. Accordingly, a compound device can be provided that operates as a digital television while simultaneously also operating as a portable telephone base station.

In the compound device, it is preferable that the selection portion selects the program stored in the portable telephone program storage portion as the program to be read out by the digital data processing portion in the case where digital data for portable telephones are output to the digital data processing portion from the analog signal processing portion for portable telephone base stations and only if the communications line is not in use by a communications tool other than the portable telephone.

This configuration, for example, enables the compound device to operate as a portable telephone base station only when, in the household where the compound device has been installed, the communications line (telephone line, for example) connecting the compound device and the telephone station is not in use by communications tools such as a connected telephone, facsimile, or computer in that household in the case where the communications line also is connected to the communications tools. Consequently, the compound device can be allowed to function as a portable telephone base station without affecting other communications tools using the communications line in the household or the like in which the compound device has been set up.

In the compound, device it is preferable that the selection portion selects the program stored in the portable telephone program storage portion as the program to be read out by the digital data processing portion in the case where digital data for portable telephones are output to the digital data processing portion from the analog signal processing portion for portable telephone base stations and only if the digital data processing portion is not executing the program stored in the digital television program storage portion.

According to this configuration, in the case where the compound device is functioning as a digital television, that compound device is not operating as a portable telephone base station, and the compound device to be used as a portable telephone base station only when the owner of the compound device is not using the compound device as a digital television. Thus, the compound device can be allowed to function as a portable telephone base station while the owner of the compound device is ensured priority use.

It is preferable that the compound device is provided with a communication record portion for storing portable telephone communication records, and that it sends the stored communication records to the communications line. Thus, the communication records for the portable telephones can be forwarded to the telephone station or the like connected to the compound device by the communications line, and the communications records can be used in diverse applications.

Additionally, to achieve the above object, a telephone station device according to the present invention is connected to this compound device via the communications line and is provided with a communication records storage portion for receiving and storing portable telephone communication records sent from the compound device. Consequently, the telephone station stores the portable telephone communication records relayed by the compound device, so that these communication records can be used in various applications at the telephone station.

It is preferable that the telephone station device is provided with a telephone fee calculation portion for calculating a discount amount based on the communication records in the communication records storage portion and subtracting the discount amount from the usage fee of a subscribed telephone at the site where the compound device is established.

This configuration, for example, allows a discount in an amount corresponding to how long, for example, the compound device functioned as a portable telephone base station to be applied suitably to the telephone fee for a subscribed telephone in the household or the like where the compound device has been installed. Accordingly, the owner of the compound device gains financial benefit by receiving a discounted telephone bill as compensation for providing their own compound device for public use. A further advantage is that the reception of such financial benefits will generate consumer appeal for the compound devices and encourage the spread of the compound devices.

Additionally, to achieve the above object, a power supply system according to the present invention includes a power supply device for supplying power to the compound device and a management device connected to the compound device via a communications line, and the management device is provided with a power fee calculation portion for calculating a discount amount based on portable telephone communication records sent from the compound device and subtracting the discount amount from the fee for the power supplied to the site where the compound device is installed.

This configuration, as with the telephone fee mentioned above, for example allows a discount in an amount corresponding to how long, for example, the compound device functioned as a portable telephone base station to be suitably applied to the power fee for the household or the like where the compound device has been installed. Accordingly, the owner of the compound device gains financial benefit by receiving a discounted power bill as compensation for providing their compound device for public use. A further advantage is that the reception of such financial benefits will spur consumer desire to purchase the compound devices and encourage the spread of the compound devices.

To achieve the above object, a portable telephone system according to the present invention has a plurality of base stations including a compound device and a telephone station device connected to the base stations via a communications line, and the telephone station device is provided with a base station selection portion for selecting, from the plurality of base stations, a base station for relaying communication with the portable telephone designated as the party with which communication is to be established.

Thus, the telephone station device can select the compound device according to the present invention, in addition to a conventional portable telephone base station, as a relay base station. Consequently, a portable telephone system having a sufficient number of base stations for the number of portable telephones can be realized without increasing the telephone company's equipment investment.

In the portable telephone system, the base station selection portion can select the base station with which electromagnetic waves from the portable telephone can be received under the best conditions, irrespective of whether the base station is the compound device. Thus, the relay base station with the best electromagnetic wave reception conditions can be selected from the plurality of base stations including compound devices in addition to conventional portable telephone base stations, so that a portable telephone system with which portable telephone users always can be provided the best communication quality can be achieved.

Alternatively, in the portable telephone system, the base station selection portion may also select with priority a base station other than the compound device from among the base stations capable of receiving electromagnetic waves from the portable telephone. This means that giving priority to the selection of conventional portable telephone base stations over compound devices and using the compound devices, which are private possessions, in an ancillary fashion makes it possible to compensate for the insufficiencies in base stations only where necessary without placing an excessive burden on the compound devices.

In the portable telephone system, it is preferable that a base station transfer request is output to the base station selection portion from the compound device when an input requesting that a compound device functioning as a base station for portable telephones functions as the consumer information processing device is received, and the base station selection portion transfers the base station for relaying communication between it and a portable telephone to a base station other than the compound device.

With this configuration, for example, in the case where the owner of a compound device wishes to use their compound device as a consumer information processing device such as a digital television when the compound device is functioning as a relay base station, the function for serving as a relay base station is transferred to another base station (including another compound device). Consequently, the owner of the compound device is given top priority for use of their compound device while the compound device can be allowed to function as a base station.

In the portable telephone system, it is preferable that the base station selection portion transfers the base station for relaying communication between it and a portable telephone to a base station other than the compound device when the compound device is functioning as a base station for a portable telephone, and a request for communication with respect to a communications tool at the site where the compound device is installed and connected to the communications line is received.

With this configuration, for example in the case where the communications line (telephone line, for example) connecting the compound device and the telephone station is also connected to communications tools such as the household subscribed telephone, facsimile device, or computer in the household where the compound device is installed, the function for serving as a relay base station is transferred to another base station (including other compound devices) when a request for communication with these communications tools is received. Consequently, the compound device can be made to operate as a portable telephone base station without affecting the other communications tools using the communications line in the household or the like where the compound device is installed.

In the portable telephone system it is preferable that a base station transfer request is output from the compound device to the base station selection portion and the base station selection portion transfers the base station for relaying communication between it and a portable telephone to a base station other than the compound device, when the compound device is functioning as a base station for a portable telephone, and a request for the use of a communications tool at the site where the compound device is installed and that is connected to the communications line is received.

With this configuration, for example, in the case where the communications line (telephone line, for example) connecting the compound device and the telephone station also is connected to communications tools such as the household subscribed telephone, facsimile device, or computer in the household or the like where the compound device is installed, the function for serving as a relay base station is transferred to another base station (including other compound devices) when an attempt is made to use these communications tools. Consequently, the compound device can be made to operate as a portable telephone base station without affecting the other communications tools using the communications line in the household or the like where the compound device is installed.

A program according to the present invention makes a computer function as a compound device having a function for serving as an image processing device for digital television and a function for serving as a base station for portable telephones. The computer is connected to an antenna device that converts electromagnetic waves for digital television into analog signals for digital television, converts electromagnetic waves for portable telephones into analog signals for portable telephones, and converts analog signals for portable telephones into electromagnetic waves for portable telephones, and is connected to a telephone station over a communications line. The computer is provided with a digital television program storage portion, a portable telephone program storage portion, and a digital data processing portion. The digital television program storage portion stores a program for converting digital data for digital television converted by the analog signal processing portion for digital television into image data and sound data. The portable telephone program storage portion stores a program for converting digital signals for portable telephones converted by the analog signal processing portion for portable telephone base stations into portable telephone communication information and outputting to the communications line, and converting the portable telephone communication information input from the communications line into digital data for portable telephones and outputting to the analog signal processing portion for portable telephone base stations. The digital data processing portion processes digital data in accordance with the program that is read out. The computer is made to execute a digital television analog signal process for inputting analog signals for digital television from the antenna device and converting these into digital data for digital television, a portable telephone base station analog signal process for converting analog signals for portable telephones converted by the antenna device into digital data for portable telephones and converting digital data for portable telephones into analog signals for portable telephones, and a selection process for selecting a program to be read out by the digital data processing portion from the program stored in the digital television program storage portion and the program stored in the portable telephone program storage portion. Running this program on the computer makes it possible to achieve an aforementioned compound device with the computer.

DESCRIPTION OF THE PREFERRED EMBODIMENTS

Hereinafter, embodiments of the compound device according to the present invention will be described in detail with reference to the drawings.

First, the structure of the compound device will be described.

Figure 1:
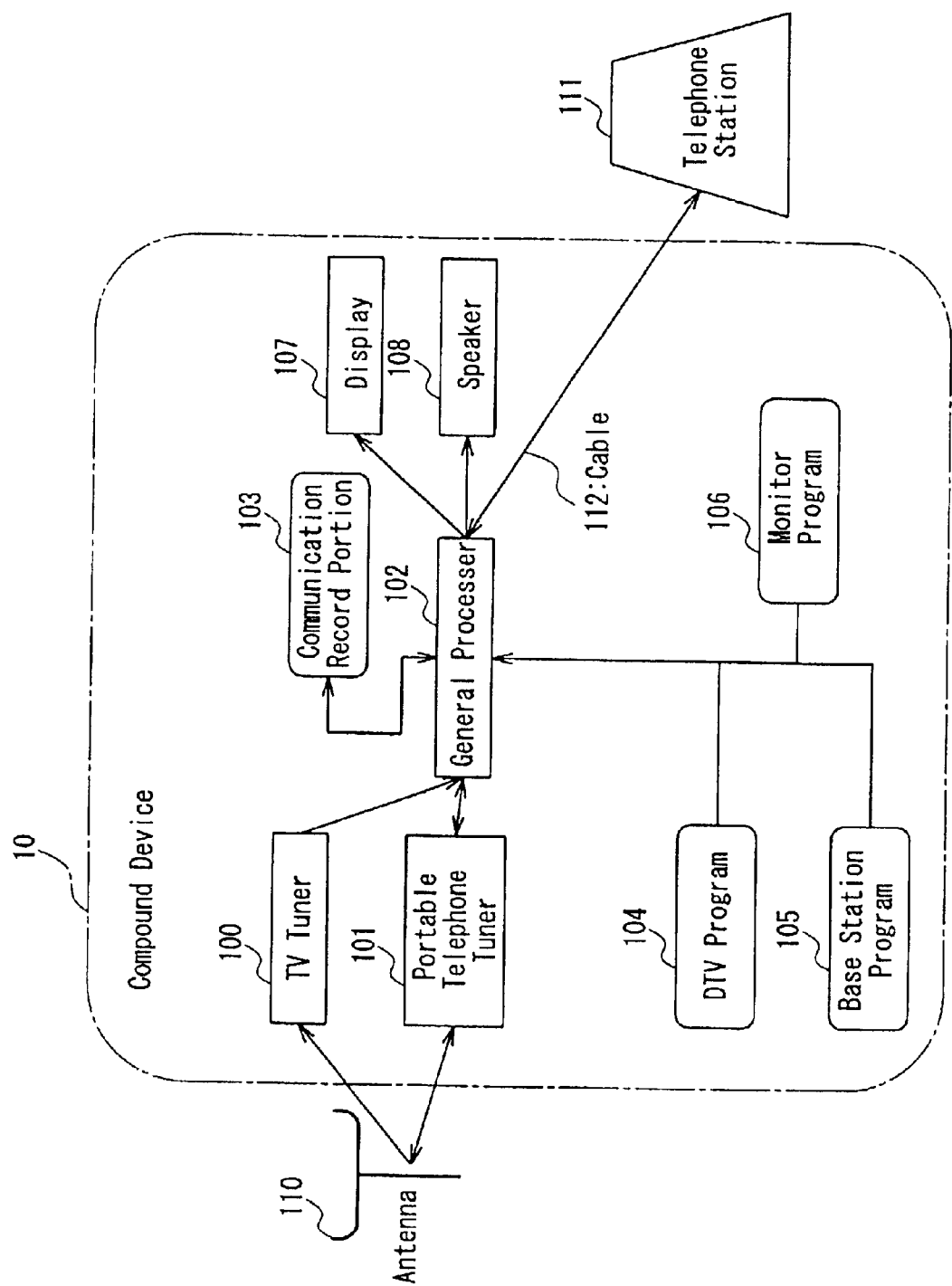
FIG. 1 is a block diagram showing the structure of the compound device according to an embodiment of the present invention.

FIG. 1 shows details of the internal configuration of the compound device according to this embodiment and the relationship in how it connects with other tools.

As shown in FIG. 1, a compound device 10 may have the outer appearance of a digital television (hereinafter, abbreviated as DTV), is provided with a TV tuner 100, a portable telephone tuner 101, a general processor 102, a communication record portion 103, a display 107, and a speaker 108, and is connected to an antenna 110.

Additionally, the compound device 10 is connected to a telephone station 111 (actually, a switchboard of the telephone station) by a cable 112, and the general processor 102 sends/receives information communicated over a portable telephone between itself and the switchboard of the telephone station 111 via the cable 112. In addition to sound data, communicated information also includes character data and image data used by the portable telephone. Moreover, there is actually a communications control device such as a modem between the general processor 102 and the cable 112, but since this configuration is well known, it has been omitted from the drawings.

It should be noted that communications tools (not shown) such as an ordinary telephone, a facsimile, or a personal computer in the household in which the compound device 10 has been installed also are connected to the telephone station 111 via the cable 112. This means that the cable 112 is shared by communications tools (including the compound device 10) within the household.

The antenna 110 outputs a DTV signal carried by electromagnetic waves of a frequency band for DTV to the TV tuner 100 as an analog signal, and outputs the communicated information, for example, carried by electromagnetic waves of a frequency band for portable telephones to the portable telephone tuner 101 as an analog signal. Additionally, the antenna 110 transmits the analog signal received from the portable telephone tuner 101 as electromagnetic waves of a frequency band for portable telephones.

The TV tuner 100 converts the DTV signal input from the antenna 110 as an analog signal into digital data and outputs to the general processor 102. The portable telephone tuner 101 has a function for converting information communicated over a portable telephone, for example, from an analog signal into digital data or conversely from digital data into an analog signal. This means that the portable telephone tuner 101 converts the analog signal of the portable telephone that is input from the antenna 110 into digital data and outputs these data to the general processor 102, whereas it converts the digital, data of the portable telephone that are input from the general processor 102 into an analog signal and outputs to the antenna 110.

The general processor 102 achieves the DTV function and the portable telephone base station function of the compound device 10 by executing digital calculations in concert with programs. It should be noted that the programs for controlling how the general processor 102 operates are for example a DTV program 104, a base station program 105, and a monitor program 106. Details on how each of these programs operates are discussed later.

The communication record portion 103 stores communication records relating to the party communicated with and the time of communication, for example, if the compound device 10 functions as a portable telephone base station.

The DTV program 104 is a program for running on the general processor 102 a process through which the digital data of the DTV are converted into image data and sound data. The base station program 105 converts digital data for the portable telephone into communication information if these data are inputted, and if communication information is inputted, it executes a process on the general processor 102 for converting this information into digital data. This program also makes the general processor 102 execute a process for creating and storing communication records if the compound device 10 functions as a portable telephone base station. The monitor program 106 is resident in the general processor 102 and controls the compound device 10 by making the general processor 102 manage inputting and outputting.

The display 107 displays the image data as moving pictures, and the speaker 108 outputs the sound data as sound. Accordingly, the compound device 10 functions as a DTV.

Figure 2:
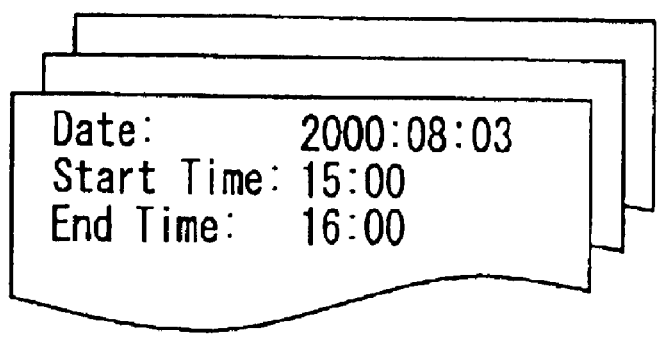
FIG. 2 is an explanatory drawing showing an example of the communication records stored in the communication record portion of the compound device.

FIG. 2 shows the structure of the communication record data stored in the communication record portion 103. Each time the compound device 10 functions as a base station, the three factors of the date, the start time, and the end time serve as the unit for the communication records and are accumulated and recorded in the communication record portion 103.

Hereinafter, the operation of the compound device 10 will be described.

Figure 3:
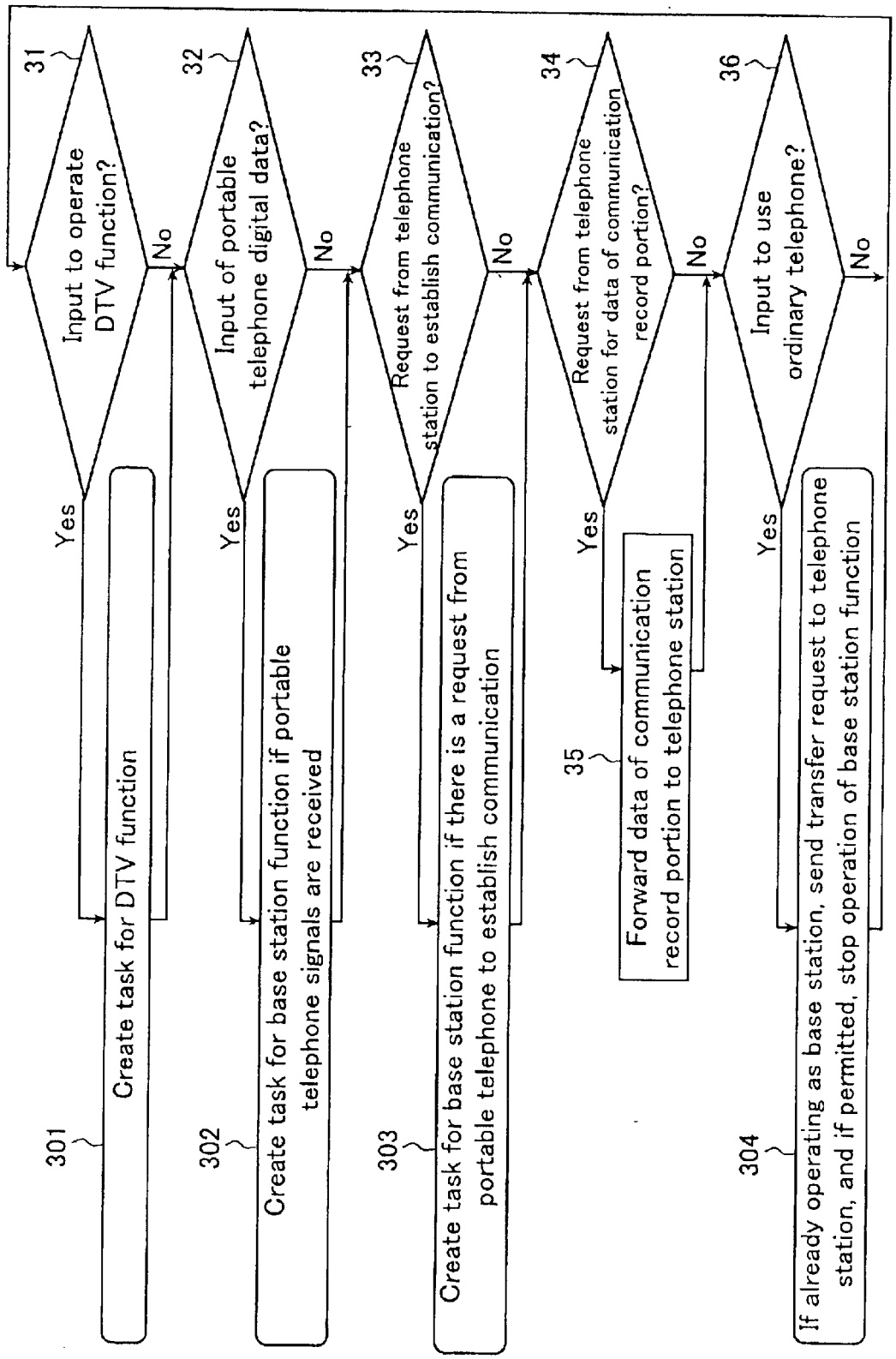
FIG. 3 is a flowchart showing the monitor program controlled operation of the general processor in the compound device.

FIG. 3 is a flowchart illustrating how the monitor program 106 controls the operation of the general processor 102.

When the compound device 10 is activated, the general processor 102 loads and starts running the monitor program 106.

First, the general processor 102 determines whether there has been input to operate the DTV function from the user of the compound device 10 (step 31). If the result determined in step 31 is yes, then the general processor 102 creates a task for the DTV function (step 301). Details of the process in step 301 are discussed later.

Next, the general processor 102 determines whether there has been input of digital data with respect to the portable telephone from the portable telephone tuner 101 (step 32). If the result determined in step 32 is yes, then the general processor 102 creates a task for the base station function for the case that a portable telephone signal is received (step 302). Details of the process in step 302 are discussed later.

Next, the general processor 102 determines whether there is a request from the telephone station 111 to establish communication (step 33). If the result determined in step 33 is yes, then the general processor 102 creates a task for the base station function for the case that there is a request from the telephone station to establish communication (step 303). Details of the process in step 303 are discussed later.

Then, the general processor 102 determines whether there is a request from the telephone station 111 to transfer the data of the communication record portion 103 (step 34). If the result determined in step 34 is yes, then the general processor 102 transfers the data of the communication record portion 103 to the telephone station 111 (step 35).

Next, the general processor 102 determines whether there is input from the user of the compound device 10 for using an ordinary telephone (step 36). As mentioned before, communications tools such as an ordinary telephone in a household where the compound device 10 has been installed are, as the compound device 10, connected to the telephone station 111 via the cable 112, and for example, picking up the receiver of the telephone inputs a signal indicating the use of the cable 112 by the ordinary telephone to the compound device 10. This signal can be output by the ordinary telephone or a multipoint connector or the like for connecting the cable 112 and the communications tools (including the compound device 10) in the household.

If the result determined in step 36 is yes, then the general processor 102 executes a step 304. Here, if the base station function is already in operation, then a request to transfer is sent to the telephone station 111, and if the transfer is allowed, the general processor 102 stops operating the base station function. This is the same process, without step 45, as that of the flowchart in FIG. 4 mentioned later.

The general processor 102 repeats steps 31 to 36 (step 304).

Figure 4:
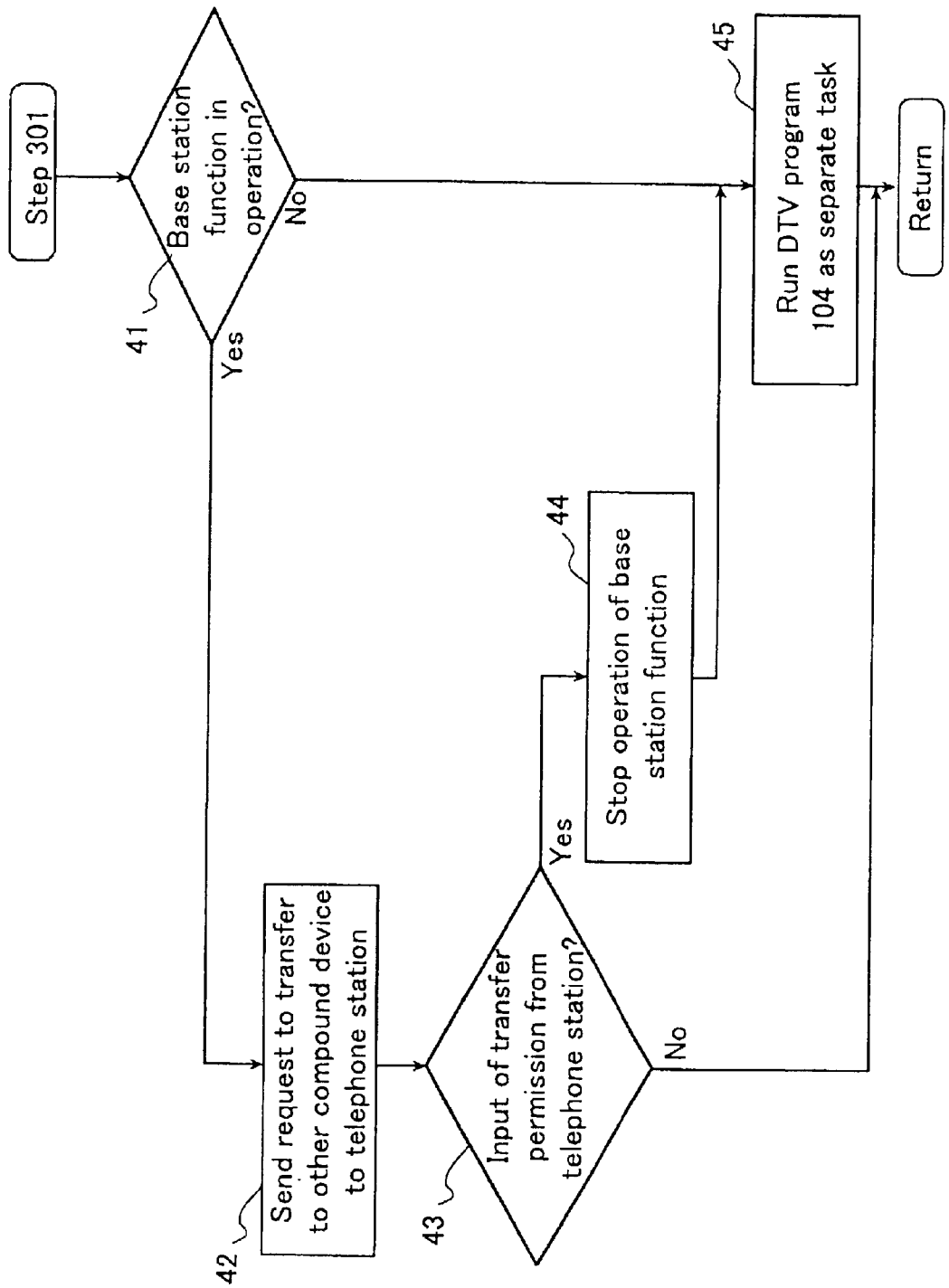
FIG. 4 is a flowchart showing details of the process in step 301 of FIG. 3.

Here, FIG. 4 shows in detail the process of step 301.

(1) First, whether the general processor 102 is already executing the base station program 105 as a separate task is determined (step 41).

(2) If in step 41 this is determined to be yes, then a request to transfer to another compound device is sent to the telephone station 111 to establish on another compound device the communication presently being carried out (step 42).

(3) Next, it is determined whether permission to transfer has been input to the general processor 102 from the telephone station 111 in response to the process in step 42 (step 43).

(4) If in step 43 this is determined to be yes, then the base station program 105 being executed by the general processor 102 is stopped (step 44).

(5) Only if in step 41 the result is no or the process of step 44 has been performed, is the DTV program 104 executed by the general processor 102 as a separate task (step 45).

Figure 5:
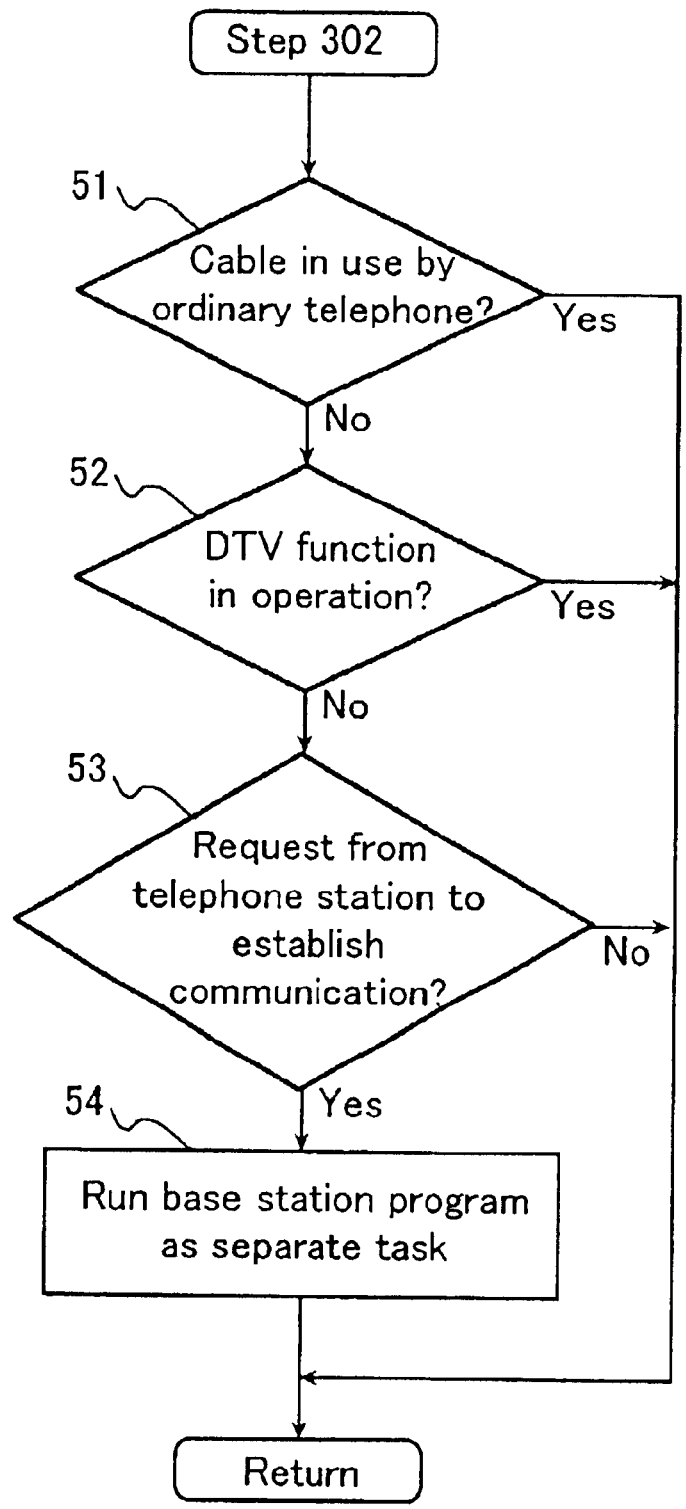
FIG. 5 is a flowchart showing details of the process in step 302 of FIG. 3.

Step 302 is detailed below, in accordance with the flowchart shown in FIG. 5.

(1) First, it is determined whether the cable 112 is in use for communication with an ordinary telephone or other household device (step 51).

(2) In step 52, it is determined whether the general processor 102 is already executing the DTV program.

(3) In step 53, it is determined whether there is a request from the telephone station 111 to establish communication.

(4) In the case where no is determined in step 51 and step 52 and yes is determined in step 53, the base station program 105 is executed by the general processor 102 as a separate task (step 54).

Figure 6:
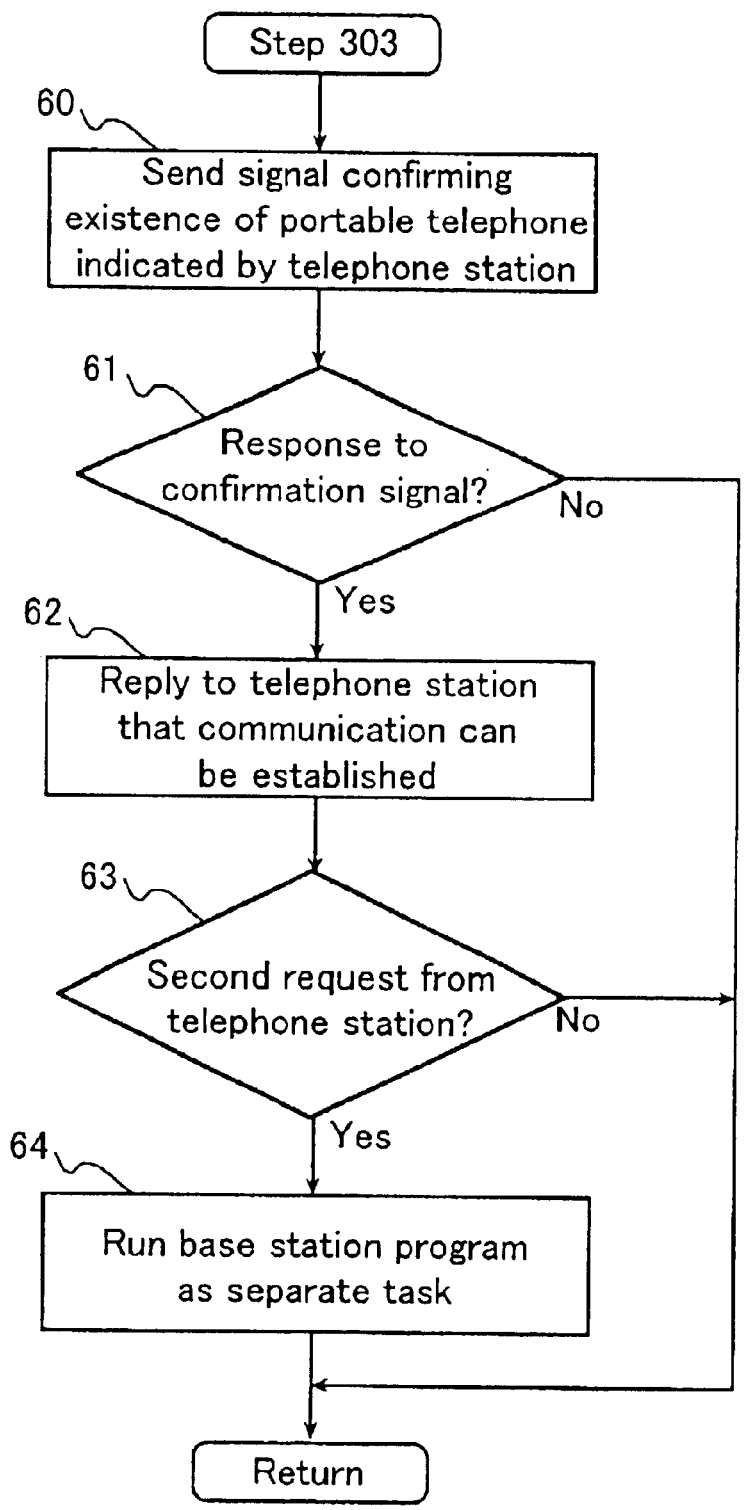
FIG. 6 is a flowchart showing details of the process in step 303 of FIG. 3.

Step 303 is detailed below, in accordance with the flowchart shown in FIG. 6.

(1) First, a signal for confirming the existence of the portable telephone designated by the telephone station 111 is transmitted from the portable telephone tuner 101 via the antenna 110 (step 60).

(2) Next, the general processor 102 determines whether the portable terminal has responded to the signal of step 60 (step 61). That is, the general processor 102 determines whether there is input from the portable tuner 101 of digital data of the response from the portable telephone.

(3) If in step 61 this is determined to be yes, then digital data from the designated portable telephone are received and a process for notifying the telephone station 111 that communication can be established is performed (step 62). If in step 61 this is determined to be no, then the process of step 303 is ended.

(4) In step 63, it is determined whether there is another request from the telephone station 111 to establish communication.

(5) If in step 63 this is determined to be yes, then the base station program 105 is executed by the general processor 102 as a separate task (step 64). If in step 63 this is determined to be no, then the process in step 303 is ended.

Figure 7:
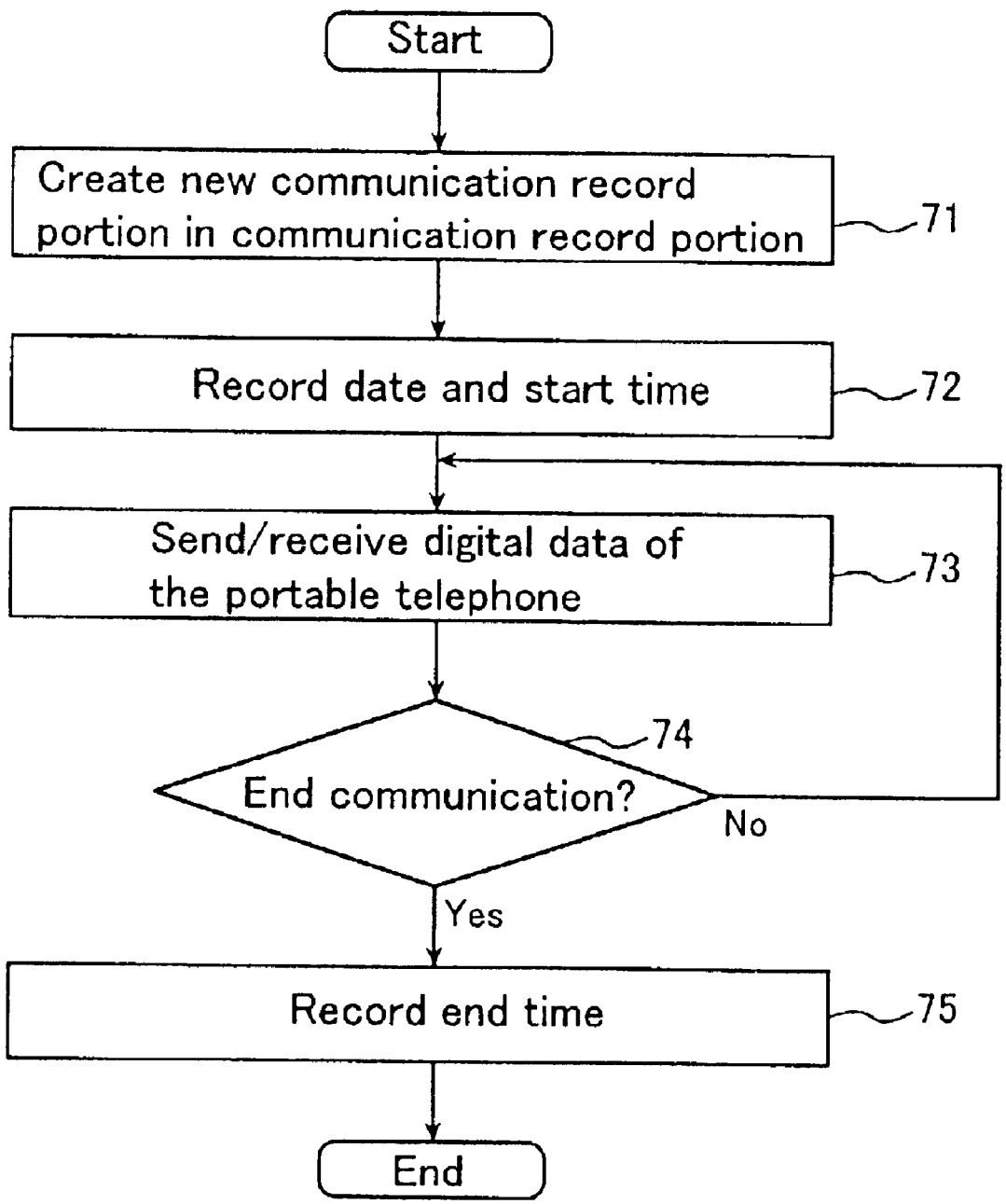
FIG. 7 is a flowchart showing the base station program controlled operation of the general processor in the compound device.

The base station program 105 is executed by the general processor 102 as detailed below, in accordance with the flowchart shown in FIG. 7.

(1) First, a region for recording new communication records information like that shown in FIG. 2 is created in the communication record portion 103 (step 71).

(2) Next, the date and start time of communication is recorded in the communication records information region that is created (step 72).

(3) Digital data of the portable telephone are sent and received (step 73). It should be noted that step 73 is repeated until there is input from the portable telephone tuner 101 or the telephone station 111 of a signal for ending communication, that is, while the result determined in step 74 is no.

(4) When a signal for ending communication is input from the portable telephone tuner 101 or the telephone station 111 (yes is determined in step 74), the end time of the communication is recorded in the communication records information region created in step 71 (step 75).

The overall configuration of the portable telephone system including the compound device as a base station according to the present embodiment is described next.

Figure 8:
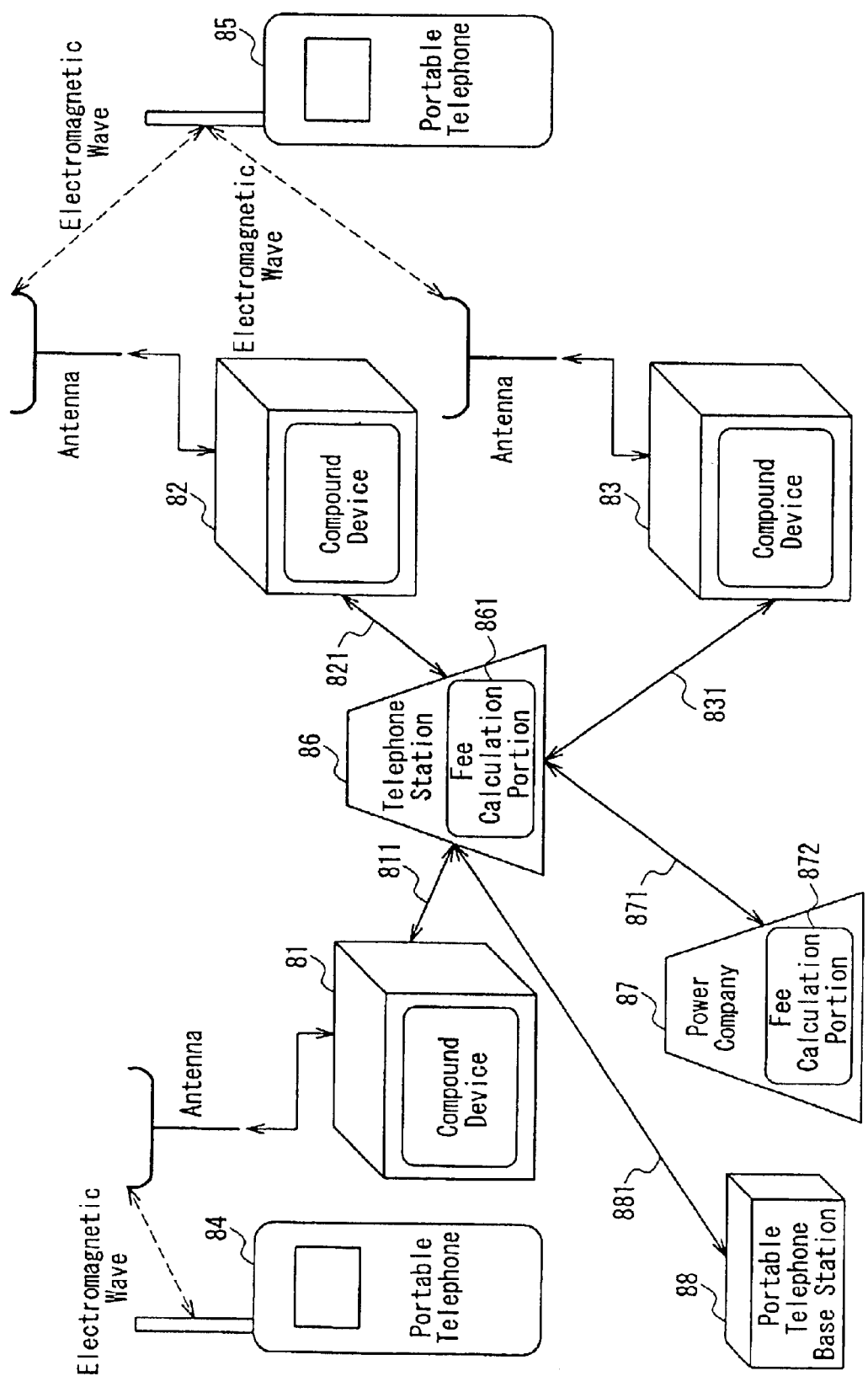
FIG. 8 is a block diagram showing the structure of the portable telephone system including the compound device.

FIG. 8 shows the configuration of the portable telephone system. Compound devices 81, 82, and 83 are the same as the compound device 10 shown in FIG. 1, and each is connected to an antenna and cables. Portable telephones 84 and 85 are portable telephones commonly known in the art. The compound devices 81, 82, and 83 are connected to a telephone station 86 (actually, to a switchboard of the telephone station) by cables 811, 821, and 831, respectively. The telephone station 86 has been provided with a fee calculation portion 861.

A power company 87 supplies power to the compound devices 81, 82, and 83. However, the electrical wiring for supplying power has been omitted in FIG. 8. The power company 87 is connected to the telephone station 86 by a cable 871. The power company 87 also has been provided with a fee calculation portion 872. A portable telephone base station 88 is widely known in the art, and is connected to the telephone station 86 through a cable 881.

Figure 9:
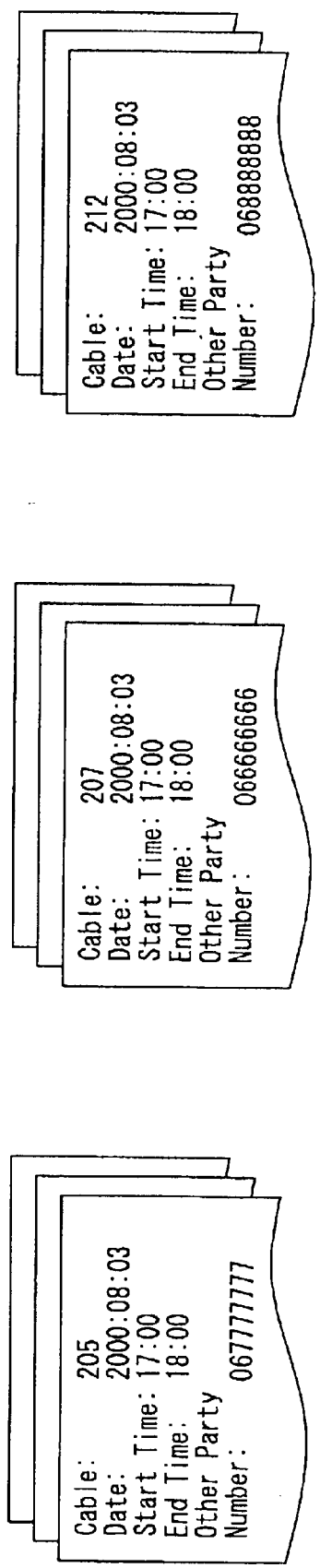
FIG. 9 is an explanatory drawing showing an example of the telephone records information recorded by the telephone station in the portable telephone system including the compound device.
Figure 10:
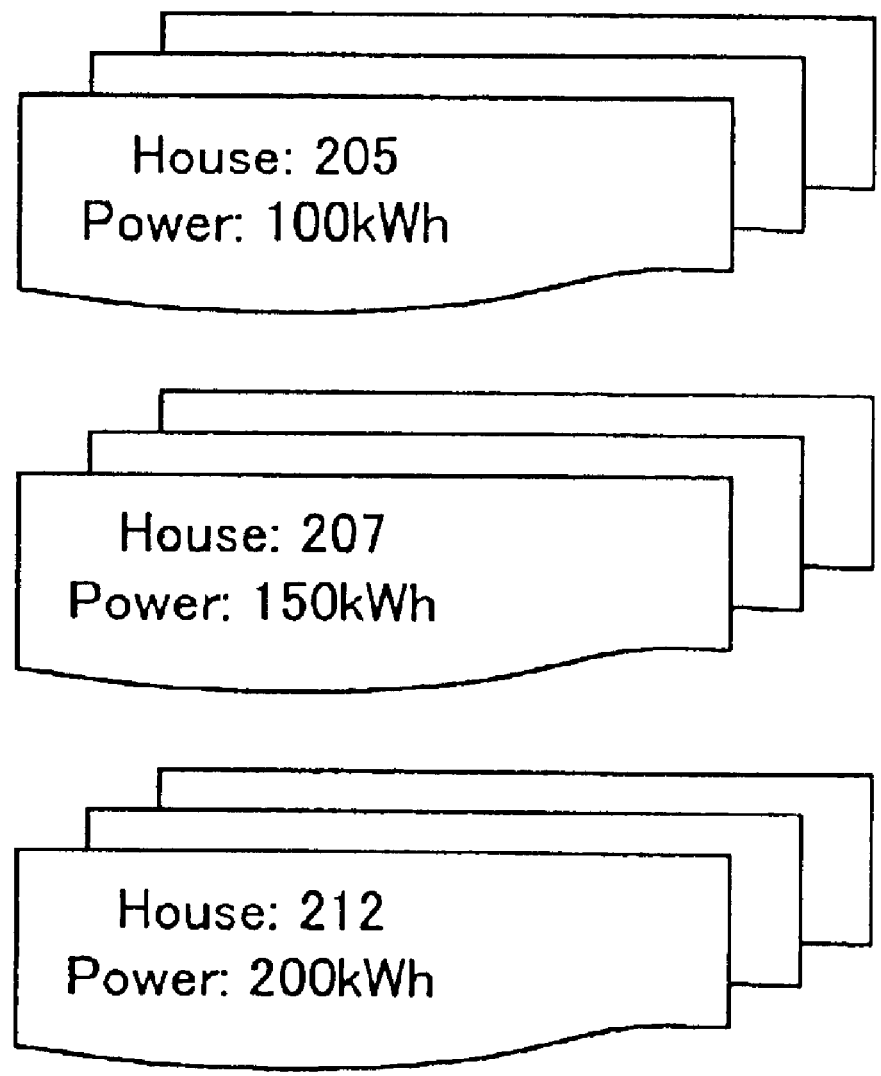
FIG. 10 is an explanatory drawing showing an example of the power supply information recorded by the power company.

FIG. 9 shows an example of the telephone records information recorded by the telephone station 86. The unit for the telephone records information includes five factors: the identification number of the cable used in communication, the date of the communication, the start time and the end time of the communication, and the other party's number. FIG. 10 shows an example of the power supply information recorded by the power company 87. The unit of power supply information includes two factors: the identification number of the home supplied with power, and the supplied power.

The description in FIG. 9 has been made readily understandable by using the cable reference numbers shown in FIG. 8 for the identification number of the cable, but the actual identification numbers used are assigned to each cable by the telephone company, for example. It also is possible to use the telephone number of the subscribed telephone in place of the identification number of the cable. Similarly, the purpose behind using the numbers 205, 207, and 212 in the example shown in FIG. 10 as the identification numbers for the homes is to represent the number for the homes in which the compound devices 81 to 83 shown in FIG. 8 are installed. The numbers actually used are assigned to each home by the power company, for example.

Figure 11:
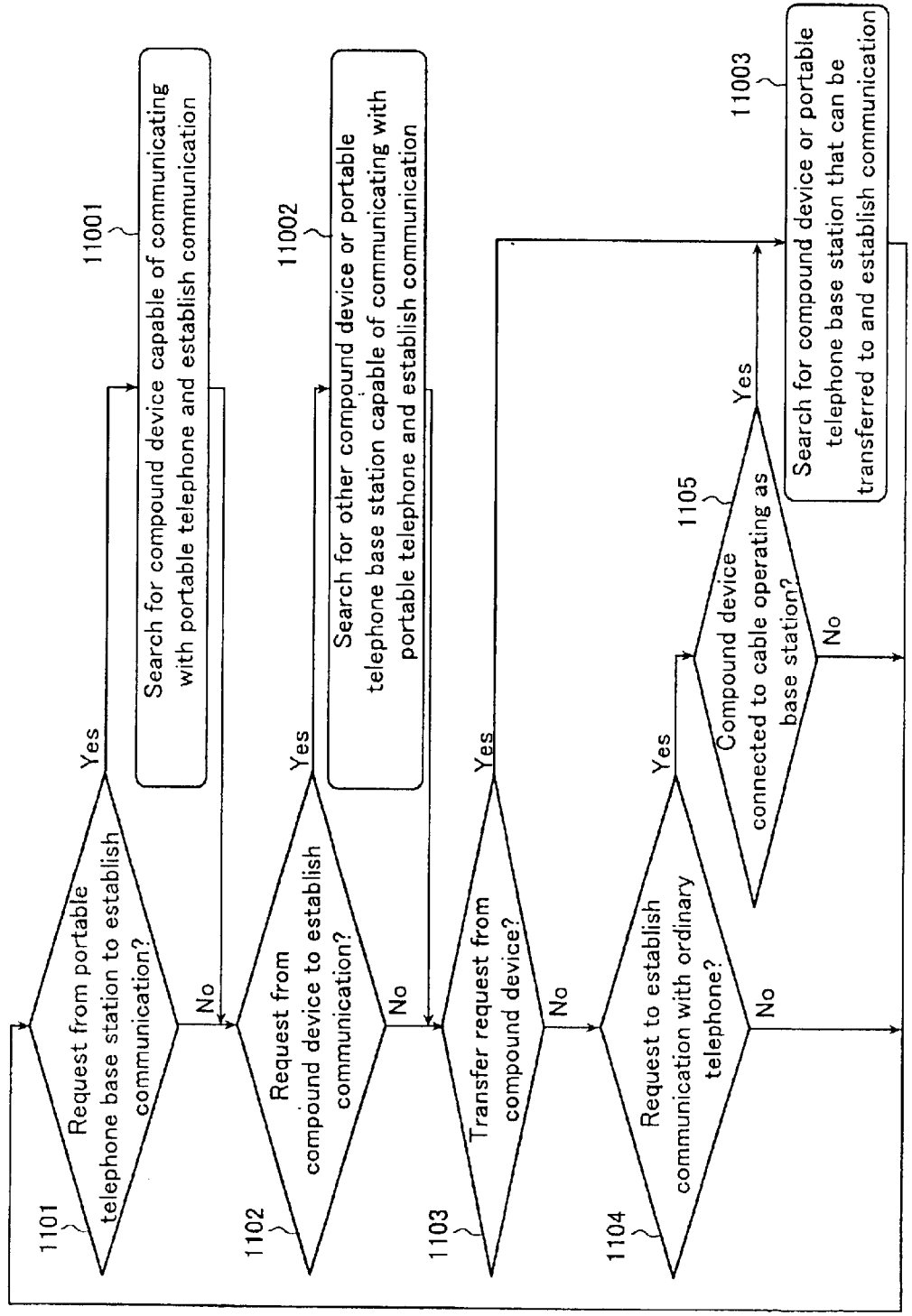
FIG. 11 is a flowchart showing the procedure of the process in which the telephone station establishes communication with a portable telephone.
Figure 14:
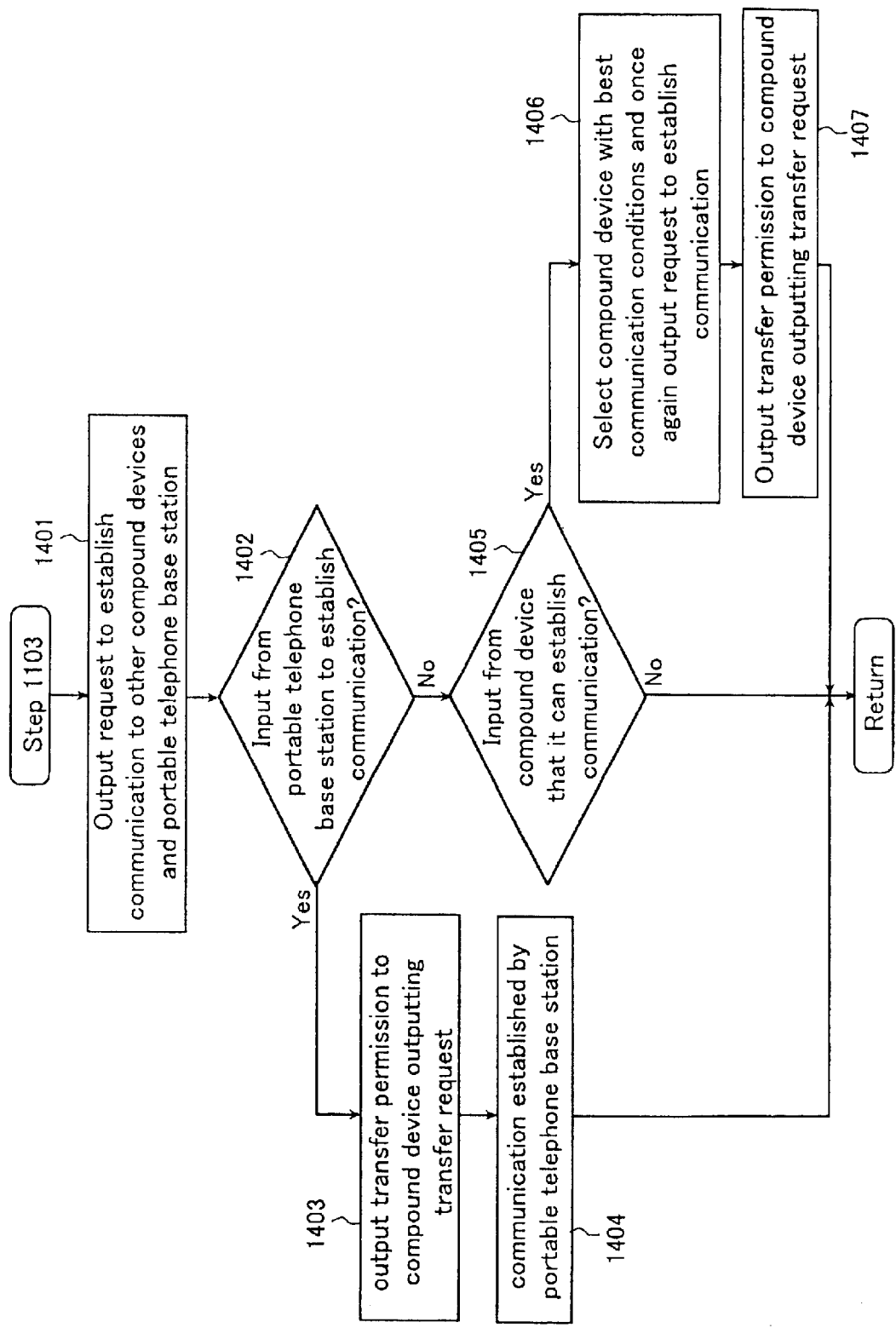
FIG. 14 is a flowchart showing the details of the process in step 11003 of FIG. 11.
Figure 15:
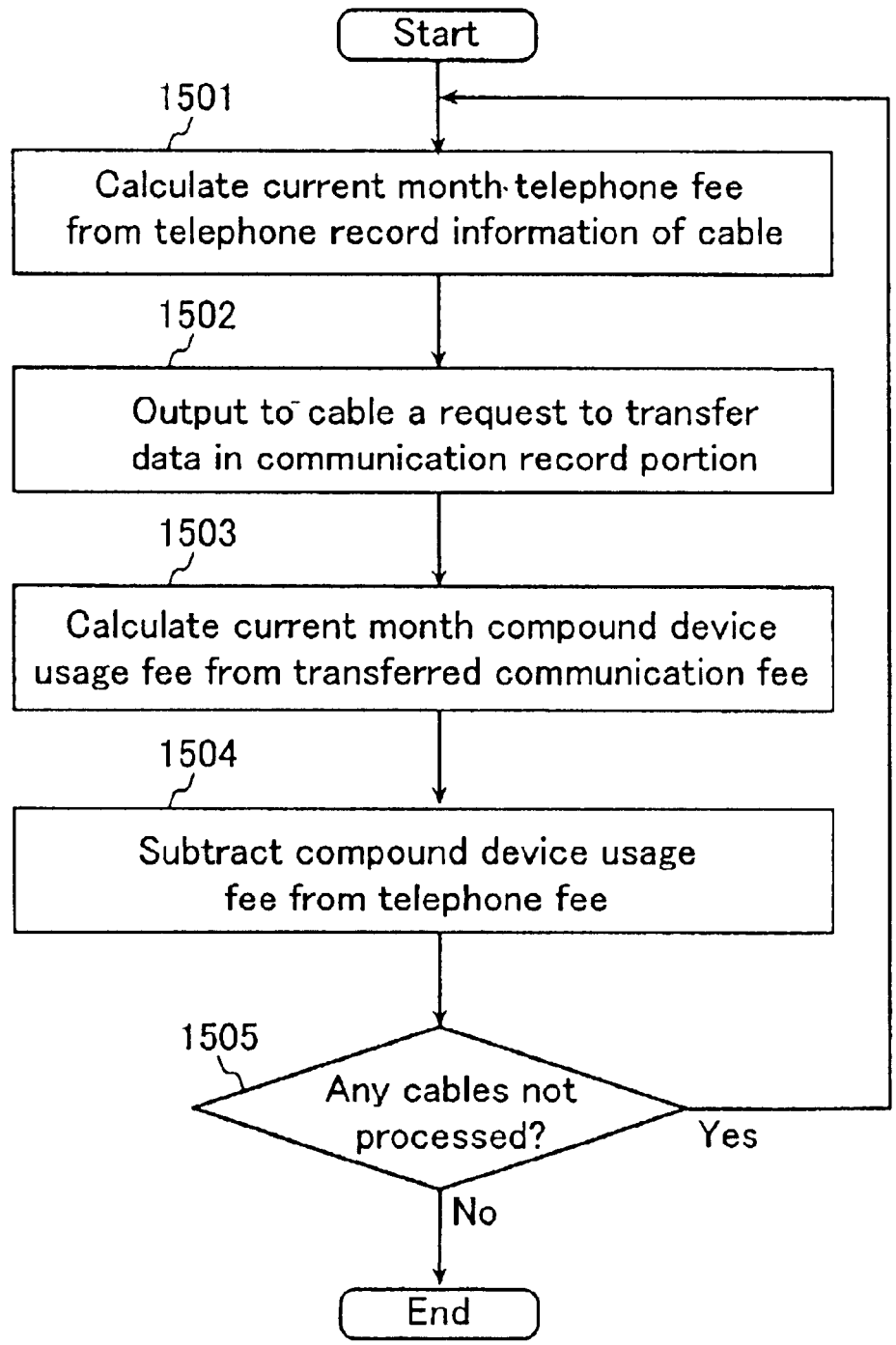
FIG. 15 is a flowchart showing the process by which the telephone station calculates the telephone fee.
Figure 16:
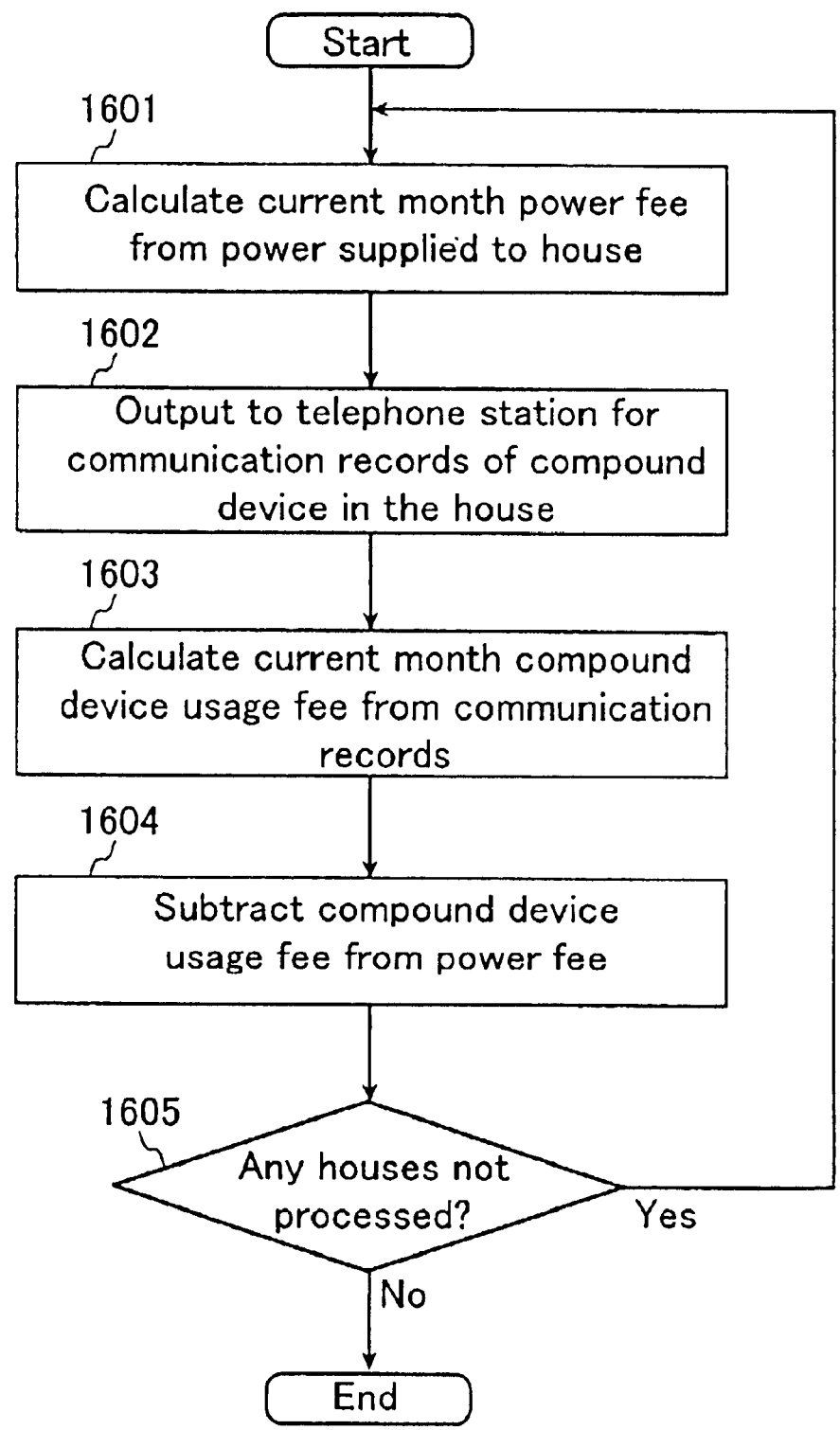
FIG. 16 is a flowchart showing the process by which the power company calculates the power fee.
Figure 17:
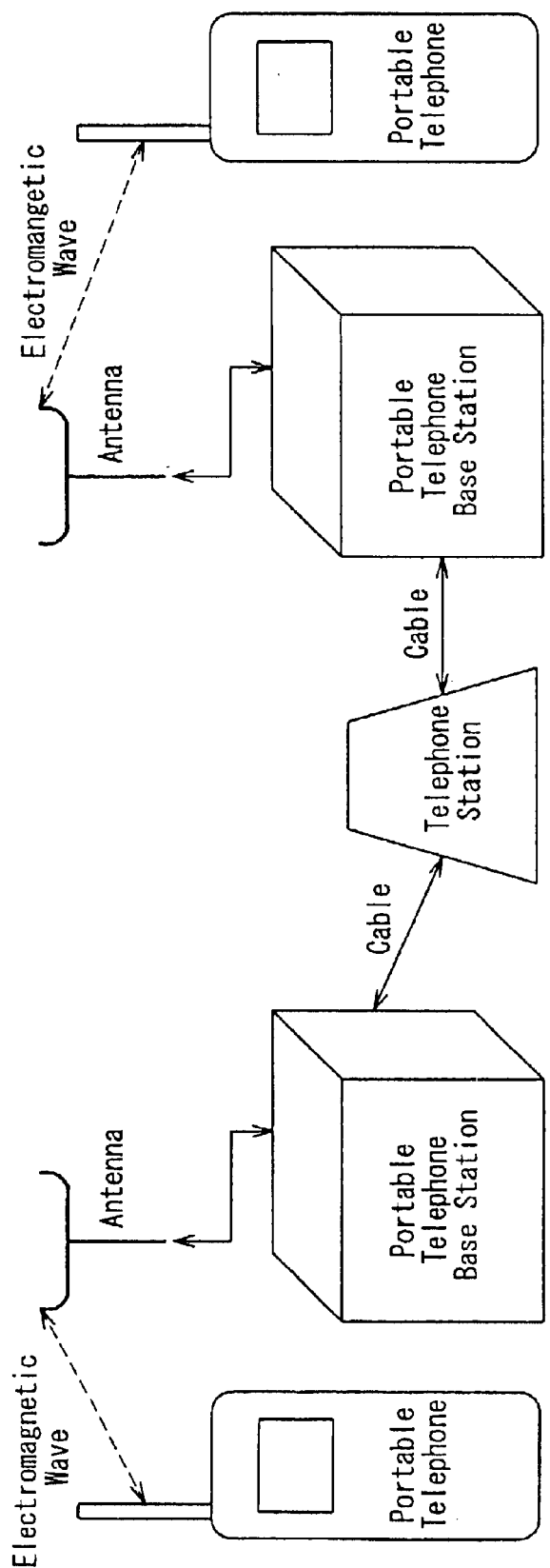
FIG. 17 is a block diagram showing the structure of a conventional portable telephone system.

FIG. 11 is a flowchart showing the process in which the telephone station 86 establishes communication over a portable telephone. The steps 11001, 11002, and 11003 of FIG. 11 are detailed in FIGS. 12, 13, and 14, respectively. FIG. 15 is a flowchart showing the process by which the telephone station 86 calculates the telephone fee. FIG. 16 is a flowchart showing the process by which the power company 87 calculates the power fee.

First, the operation by which this portable telephone system establishes communication with a portable telephone is described according to the flowcharts in FIGS. 11 to 14. Here, the compound devices 81, 82, and 83 operate as mentioned earlier, and the description centers on the operation of the telephone station 86.

The telephone station 86 constantly executes the process according to the flowchart of FIG. 11. This process is executed in the following steps.

(1) In step 1101, the telephone station 86 determines whether there has been input from the portable telephone base station 88 of a request to establish communication. This is determined to be yes in the case where (a) the portable telephone base station 88 receives a request to establish communication from a portable telephone within its station area, (b) the portable telephone base station 88 outputs a request to establish communication in order to search for the portable telephone designated as the other party in the request to establish communication, and (c) that request is input to the telephone station 86 via the cable 881.

(2) If in step 1101 this is determined to be yes, then the telephone station 86 searches among the compound devices 81, 82, and 83 for a compound device that can communicate with the portable telephone designated as the other party in the request to establish communication, and performs a process for establishing communication (step 11001).

(3) In step 1102, the telephone station 86 determines whether there is a request to establish communication from any of the compound devices 81, 82, and 83. This is determined to be yes in the case where (a) any of the compound devices 81, 82, and 83 receives a request to establish communication from a portable telephone, (b) that compound device outputs a request to establish communication in order to search for the portable telephone serving as the other party, and (c) that request is input to the telephone station 86 via any of the cables 811, 821, and 831.

(4) If in step 1102 this is determined to be yes, then the telephone station 86 searches among the other compound devices and the portable telephone base stations 88 for a compound device or a portable telephone base station 88 capable of communicating with the portable telephone designated as the other party in the request to establish communication in step 1101, and carries out a process for establishing communication (step 11002).

(5) In step 1103, the telephone station 86 determines whether there has been input for a transfer request from any of the compound devices 81, 82, and 83. The operation by which a compound device outputs a transfer request is the same as that described in the process of step 42 in FIG. 4, and thus the description thereof is omitted here.

(6) If in step 1103 this is determined to be yes, then the telephone station 86 searches among the other compound devices and portable telephone base stations for a compound device or a portable telephone base station to which transfer is possible, and establishes communication (step 11003).

(7) In step 1104, the telephone station 86 determines whether there is a request to establish communication with an ordinary telephone or other household equipment that uses any of cables 811, 821, and 831. This communication request is output from an ordinary telephone not shown in FIG. 8 and is input to the telephone station 86. "Ordinary telephone" used here refers to a telephone that does not employ mobile communications and that is a subscribed telephone installed in the same household as the compound devices 81, 82, and 83.

(8) If in step 1104 this is determined to be yes, then the telephone station 86 further performs the determination of step 1105. In step 1105, the telephone station 86 determines whether a compound device connected to the cable used in the request to establish communication with an ordinary telephone is operating as a base station.

(9) If in step 1105 this is determined to be yes, then the telephone station 86 searches among the other compound devices and the portable telephone base stations for a compound device or a portable telephone base station to which transfer is possible, and establishes communication therewith (step 11003).

The telephone station 86 repeats the above steps (1) to (9).

Figure 12:
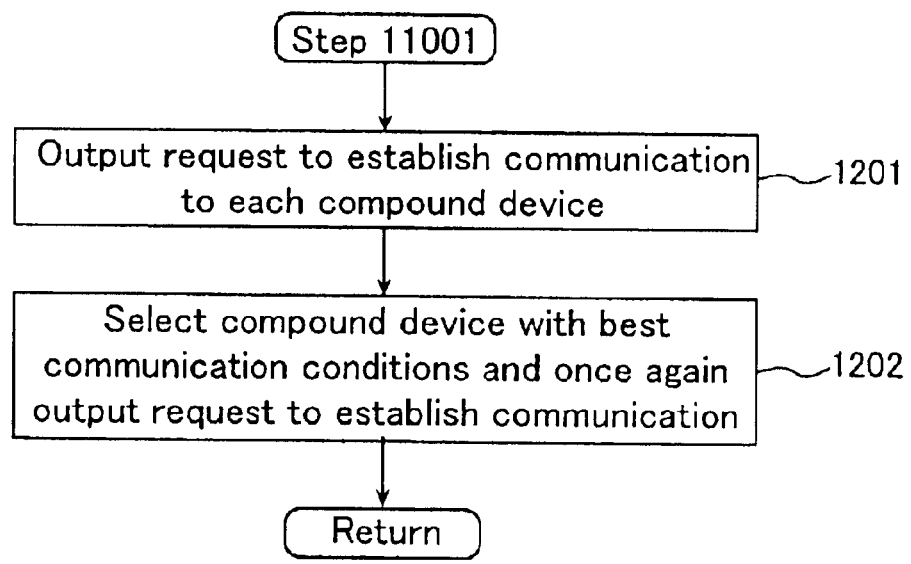
FIG. 12 is a flowchart showing the details of the process in step 11001 of FIG. 11.

The above step 11001 is detailed below, in accordance with the flowchart shown in FIG. 12.

(1) First, the telephone station 86 outputs a request to the compound devices 81, 82, and 83 to establish communication in order to search for the portable telephone of the party to communicate with (step 1201).

(2) Each of the compound devices input with the request of (1) determine whether communication can be established and notifies the telephone station 86 of whether communication can be established. This determination and process are equivalent to the determination in step 33 of FIG. 3 and a portion of the process of step 303, that is, steps 60 to 62 in FIG. 6, and since they have been described previously, the details thereof are omitted here. In step 1202, the telephone station 86 selects the compound device with the best communication conditions among the compound devices that notified the telephone station 86 that communication can be established, and once again outputs the request to establish communication to the selected compound device. The compound device receiving the second request to establish communication starts executing the base station function. The process of this compound device is equivalent to that of steps 63 and 64 of FIG. 6, and details thereof are omitted here because they have been described already. Consequently, in step 1202 the selected compound device functions as a base station and communication with the portable telephone base station 88 is established.

Step 11002 is detailed below in accordance with the flowchart shown in FIG. 13.

(1) First, the telephone station 86 outputs a request to the portable telephone base station 88 and the outer compound devices to establish communication in order to search for the portable telephone that is to be communicated with (step 1301).

(2) The telephone station 86 next determines whether there is input to establish communication from the portable telephone base station 88 (step 1302).

(3) If in step 1302 this is determined to be yes, then the telephone station 86 establishes communication between the compound device and the portable telephone base station 88 (step 1304).

(4) If in step 1302 this is determined to be no, then the telephone station 86 selects the compound device with the best communication conditions among the compound devices from which input that communication can be established is received, and once again outputs a request to the selected compound device to establish communication, and establishes communication between the compound devices (step 1303).

The procedure of the above step 11003 is detailed below in accordance with the flowchart shown in FIG. 14.

(1) In order to establish communication in place of the compound device that has output the transfer request, the telephone station 86 first executes a process for outputting a request to establish communication to other compound devices and the portable telephone base station 88 (step 1401).

(2) The telephone station 86 next determines whether there has been input to establish communication from the portable telephone base station 88 in response to the output from step 1401 (step 1402).

(3) If in step 1402 this is determined to be yes, then the telephone station 86 executes a process for outputting permission to transfer to the compound device that has output the transfer request (step 1403). Next, a process is performed for making the portable telephone base station 88 establish communication (step 1404). On the other hand, the compound device that has output the transfer request stops functioning as a base station when the output from step 1403 is input. This process is equivalent to that of steps 43 and 44 of FIG. 4, and a description thereof is omitted here because this process has been detailed already.

(4) If it is determined in step 1402 that this is no, then the telephone station 86 determines whether there is notification that communication can be established from a compound device of those that have output a request to establish communication in step 1401 (step 1405).

(5) If it is determined in step 1405 that this is yes, then the telephone station 86 selects the compound device with the best communication conditions among the compound devices notifying that communication can be established, and once again outputs a request to establish communication (step 1406). The compound device that receives this request establishes communication. The process of this compound device is equivalent to that of steps 63 and 64 in FIG. 6, and since it has been described already, a description thereof is omitted here. Next, the telephone station 86 outputs a permission to transfer to the compound device that has output the transfer request (step 1407). The compound device that has output the transfer request receives this permission and stops operating as a base station. This process is equivalent to that of steps 43 and 44 in FIG. 4, and thus a description of the details thereof is omitted here because it has been made already.

Figure 13:
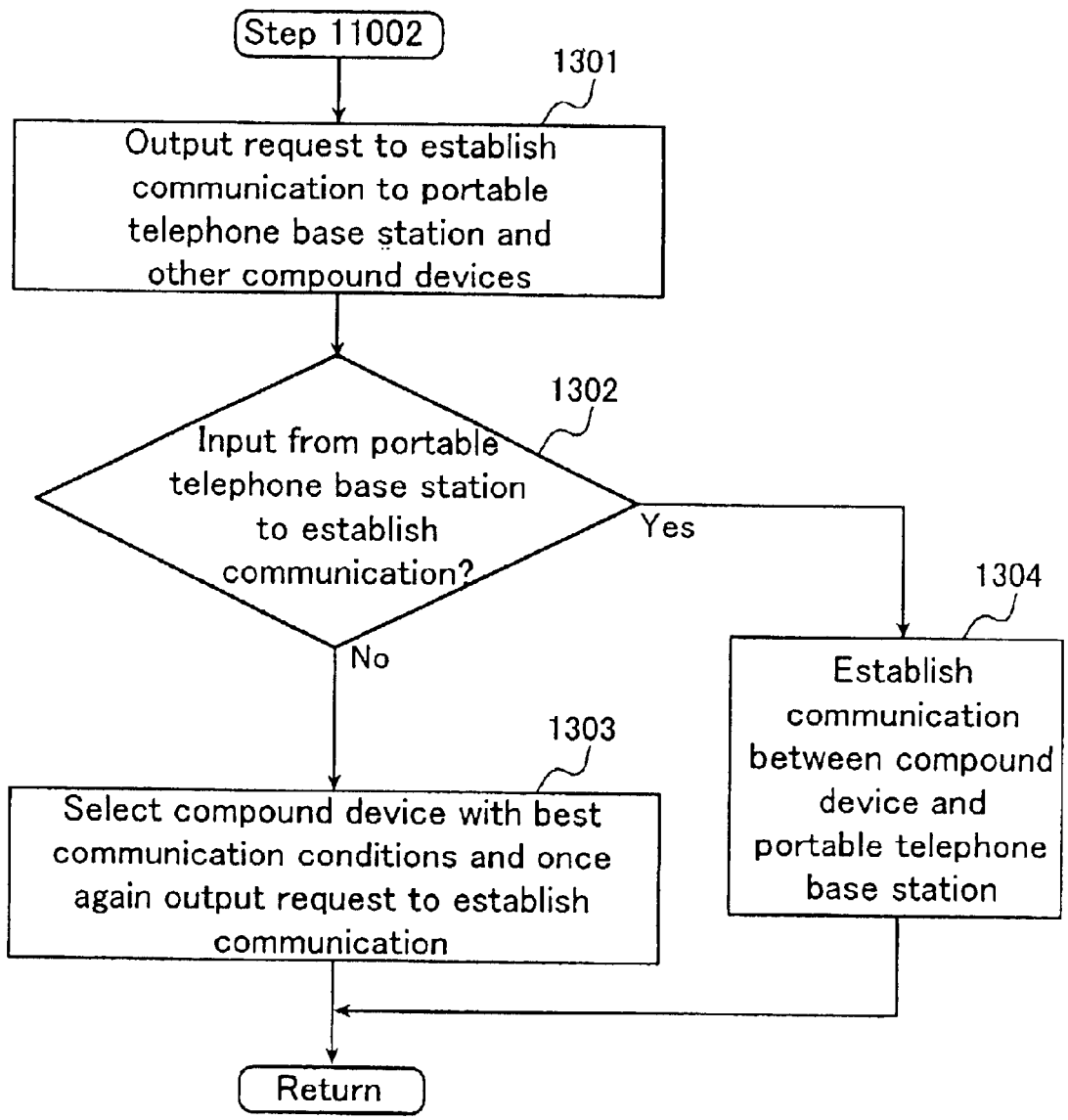
FIG. 13 is a flowchart showing the details of the process in step 11002 of FIG. 11.

As is evident from the order of determinations in the steps 1101 and 1102 of FIG. 11 and the determination made in step 1302 of FIG. 13, this system gives priority to adopting the portable telephone base station 88, rather than the compound devices 81, 82, and 83, as the base station when portable telephone communication is established.

Next, how this portable telephone system operates when calculating telephone fees is described with reference to FIG. 15.

For example, once per month only, the telephone station 86 activates the fee calculation portion 861 to calculate telephone fees. The process for calculating the telephone fees is carried out as follows, in accordance with the flowchart shown in FIG. 15.

(1) First, the fee calculation portion 861 references the telephone records information, such as those shown in FIG. 9, stored in the telephone station 86, calculates the telephone usage time from the start time and end time of the communication, and based on this and the other party's number, calculates the current month's telephone fees for each cable (step 1501).

(2) Next, the fee calculation portion 861 requests the compound device connected to each of the cables to forward the data in its communication record portion 103 (step 1502).

(3) Then, the fee calculation portion 861 calculates the usage fee for the compound devices for the current month based on the communication records transferred from each compound device (step 1503). The communication records transferred from the compound devices include, as shown in FIG. 2, the operation start time and end time for each instance a compound device functions as a portable telephone base station. Consequently, with these communications records, the fee calculation portion 861 finds the total time that each compound device functioned as a portable telephone base station during the current month, and calculates a fee corresponding to the time that is found as the compound device usage fee.

(4) Next, the fee calculation portion 861 subtracts the compound device usage fee calculated in step 1503 from the telephone fee calculated in step 1501 (step 1504). That is, this is a system in which the owner of a compound device is given financial benefit as compensation for allowing their compound device to be used for another person's portable telephone by discounting their telephone fee by the amount corresponding to the time that their compound device functioned as a portable telephone base station. Consequently, the longer a compound device functions as a portable telephone base station, the greater the amount that the telephone fee is discounted.

(5) The fee calculation portion 861 repeats steps (1) to (4) for all cables (step 1505).

Hereinabove, the operation for calculating the telephone fee according to the portable telephone system of this embodiment was described. However, the financial benefits given to the owner of a compound device are not limed to a discounted telephone fee. Another example of such financial benefits is described below with reference to FIG. 16. In this system, the power fee of the owner of the compound device is discounted in accordance with the time that their compound device functions as a portable telephone base station.

The power company 87, for example, once a month only, activates the fee calculation portion 872 to calculate the power fee. The power fee is calculated as follows and in accordance with the flowchart shown in FIG. 16.

(1) First, the fee calculation portion 872 selects a household for which to perform calculations, and it calculates the current month's power fee for that household based on the power supply information shown in FIG. 10 (step 1601).

(2) The fee calculation portion 872 next requests the telephone station 86 to forward the communication records for the compound device installed in that household (step 1602).

(3) As in step 1503 above, the fee calculation portion 872 then calculates that month's compound device usage fee based on the communication records forwarded from the telephone station 86 (step 1603).

(4) The fee calculation portion 872 then subtracts the compound device usage fee calculated in step 1603 from the power fee calculated in step 1601 (step 1604).

(5) The fee calculation portion 872 repeats the procedure of steps (1) to (4) for remaining households.

With the procedure of steps (1) to (5), the power fee for a household in which the compound device is installed is discounted in accordance with the time that the compound device functioned as a portable telephone base station, and the owner of the compound device can be rewarded financially in return for allowing their compound device to be used as a portable telephone base station by another person.

It should be noted that the amount lost by the telephone company or the power company through discounting the telephone fee or the power fee conceivably could be compensated by, for example, the portable telephone company paying an equivalent fee to the telephone company or the power company.

As set forth above, with this embodiment a portable telephone company benefits from a digital television jointly functioning as a portable telephone base station because it can reduce its equipment investment for building more portable telephone base stations. Similarly, there are financial merits for consumers purchasing a digital television that serve as a compound device in that the power fee for their home or the telephone fee for their subscribed telephone receives a discount for an amount corresponding to the time that their compound device functions as a portable telephone base station. Moreover, manufacturers of digital televisions that serve as compound devices also benefit because these financial merits will fuel consumer appeal and encourage the spread of the digital televisions.

In the above description, one embodiment of the compound device and the portable telephone system including the compound device as a base station according to the present invention has been discussed, but the present invention is not limited to this embodiment.

For example, the consumer information processing device making up the compound device was illustratively a digital television in this embodiment, but it also may be a computer or other household electronics that functions in the same manner as a digital television in the context of the present invention.

Additionally, in the above description the example illustrated was of the general processor 102 selectively executing either the DTV program 104 or the base station program 105. However, in the case where the general processor 102 is capable of executing multiple tasks in parallel, the DTV program 104 and the base station program 105 can be run simultaneously as separate tasks to achieve the two functions at once. In this case, the determinations made in steps 41 and 43 and the processes of steps 42 and 44 in FIG. 4, and the determination of step 1103 and the process of step 11003 in FIG. 11 can be omitted.

Furthermore, in this embodiment the communication records were stored in the communication record portion 103 of the compound device and where necessary the communication records were forwarded to the telephone station, but communication records for the compound device also can be sent from the compound device to the telephone station at each time, with the telephone station accumulating and storing them. Additionally, in the example shown, the amount corresponding to the time that the compound device functions as a base station is discounted from the telephone fee or the power fee. However, it is also possible to discount by an amount corresponding to the amount of information relayed by the compound device serving as a base station, in which case the amount of relayed information, instead of the start time and the end time, should be stored in the communication records.

The telephone stations 111 and 86 are not limited to the telephone stations of telephone companies, and also can be CATV stations or telephone stations for Internet telephone.

Additionally, in the above description an example was presented in which the present invention was implemented by hardware (the compound device and the portable telephone system including it), but the present invention can also be implemented as software (as programs). That is, the object of the present invention can be achieved by running a program that executes the processes shown in FIGS. 3 to 6 on a computer, a program that executes the processes shown in FIG. 7 on a computer, a program that executes the processes shown in FIGS. 11 to 14 on a computer, and a program that executes the process shown in FIGS. 15 and 16 on a computer, each being stored on some program storage medium, such as a CD-ROM, and read by a computer, or downloaded to a computer over a communications line, and each program run on the computer.

As set forth above, according to the present invention, a compound device having the functions of a portable telephone base station and a digital television can be achieved, and moreover a portable telephone system using this compound device can be achieved. This means that the present invention achieves a useful communications infrastructure for portable telephones that has significant practical value.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A compound device connected to an antenna device and a communications line in communication with a telephone station, comprising:

a first function portion for receiving and processing electromagnetic waves for a consumer information processing device via the antenna device; and a second function portion for executing a process to serve as a base station for a portable telephone via the antenna device and the communications line.

2. The compound device according to claim 1, wherein the consumer information processing device is a digital television receiver device or an image processing device for digital television.

3. The compound device according to claim 2, wherein the antenna device converts electromagnetic waves for digital television into analog signals for digital television, converts electromagnetic waves for portable telephones into analog signals for portable telephones, and converts the analog signals for portable telephone into electromagnetic waves for portable telephones, the compound device comprising:

an analog signal processing portion for digital television for inputting analog signals for digital television from the antenna device and converting them into digital data for digital television;

an analog signal processing portion for portable telephone base stations for converting the analog signals for portable telephones converted by the antenna device into digital data for portable telephones and converting the digital data for portable telephones into analog signals for portable telephones;

a digital data processing portion for processing digital data in accordance with a program that has been read out;

a digital television program storage portion for storing a program for converting digital data for digital television converted by the analog signal processing portion for digital television into image data and sound data;

a portable telephone program storage portion for storing a program for converting the digital signals for portable telephones converted by the analog signal processing portion for portable telephone base stations into portable telephone communication information and outputting it to the communications line, and converting the portable telephone communication information input from the communications line into digital data for portable telephones and outputting to the analog signal processing portion for portable telephone base stations; and a selection portion for selecting a program to be read out by the digital data processing portion from the program stored in the digital television program storage portion and the program stored in the portable telephone program storage portion.

4. The compound device according to claim 3, wherein the selection portion selects the program stored in the portable telephone program storage portion as the program to be read out by the digital data processing portion in a case where output from the analog signal processing portion for portable telephone base stations is a valid value.

5. The compound device according to claim 3, wherein the digital data processing portion is capable of executing the program stored in the digital television program storage portion and the program stored in the portable telephone program storage portion in parallel.

6. The compound device according to claim 3, wherein the selection portion selects the program stored in the portable telephone program storage portion as the program to be read out by the digital data processing portion in a case where the digital data for portable telephones are output to the digital data processing portion from the analog signal processing portion for portable telephone base stations and only if the communications line is not in use by a communications tool other than the portable telephone.

7. The compound device according to claim 3, wherein the selection portion selects the program stored in the portable telephone program storage portion as the program to be read out by the digital data processing portion in a case where the digital data for portable telephones are output to the digital data processing portion from the analog signal processing portion for portable telephone base stations and only if the digital data processing portion is not executing the program stored in the digital television program storage portion.

8. The compound device according to claim 3, comprising a transfer request processing portion for outputting a base station transfer request to the telephone station, when the digital data processing portion is executing the program stored in the portable telephone program storage portion, and an input requesting to execute the program stored in the digital television program storage portion is received.

9. The compound device according to claim 3, comprising a transfer request processing portion for outputting a base station transfer request to the telephone station, when the digital data processing portion is executing the program stored in the portable telephone program storage portion, and a request for the use of a communications tool at the site where the compound device is installed and that is connected to the communications line is received.

10. The compound device according to claim 2, wherein the antenna device converts electromagnetic waves for digital television into signals for digital television, converts electromagnetic waves for portable telephones into analog signals for portable telephones, and converts the analog signals for portable telephone into electromagnetic waves for portable telephones, the compound device comprising:

an analog signal processing portion for digital television for inputting signals for digital television from the antenna device and converting them into digital data for digital television;

an analog signal processing portion for portable telephone base stations for converting the analog signals for portable telephones converted by the antenna device into digital data for portable telephones and converting the digital data for portable telephones into analog signals for portable telephones;

a digital data processing portion for processing digital data in accordance with a program that has been read out;

a digital television program storage portion for storing a program for converting digital data for digital television converted by the analog signal processing portion for digital television into image data and sound data;

a portable telephone program storage portion for storing a program for converting the digital signals for portable telephones converted by the analog signal processing portion for portable telephone base stations into portable telephone communication information and outputting it to the communications line, and converting the portable telephone communication information input from the communications line into digital data for portable telephones and outputting to the analog signal processing portion for portable telephone base stations; and a selection portion for selecting a program to be read out by the digital data processing portion from the program stored in the digital television program storage portion and the program stored in the portable telephone program storage portion.

11. The compound device according to claim 1, comprising a communication record portion for storing portable telephone communication records; and
   wherein the compound device sends the stored communication records to the communications line.

12. A telephone station device connected to the compound device according to claim 11 via a communications line and comprising a communication records storage portion for receiving and storing portable telephone communication records sent from the compound device.

13. The telephone station device according to claim 12, comprising a telephone fee calculation portion for calculating a discount amount based on the communication records of the communication records storage portion and subtracting the discount amount from the usage fee of a subscribed telephone at the site where the compound device is installed.

14. A power supply system comprising a power supply device for supplying power to the compound device according to claim 11 and a management device connected to the compound device according to claim 11 via a communications line,
   wherein the management device comprises a power fee calculation portion for calculating a discount amount based on portable telephone communication records sent from the compound device and subtracting the discount amount from the fee for power supplied to the site where the compound device is installed.

15. A program for executing, on a computer connected to the compound device according to claim 11 via a communications line and comprising a communication records storage portion for receiving and storing communication records for portable telephones that are sent from the compound device, a telephone fee calculation process for calculating a discount amount based on the communication records in the communication records storage portion and subtracting the discount amount from the usage fee for a subscribed telephone at the site where the compound device is installed.

16. A program for executing, on a computer connected to the compound device according to claim 11 via a communications line, a power fee calculation process for calculating a discount amount based on portable telephone communication records sent from the compound device and subtracting the discount amount from the fee for the power supplied to the site where the compound device is installed.

17. A portable telephone system comprising a plurality of base stations including a compound device according to claim 1 and a telephone station device connected to the base stations via a communications line,
   wherein the telephone station device comprises a base station selection portion for selecting, from the plurality of base stations, a base station for relaying communication between it and a portable telephone designated as the party with which communication is to be established.

18. The portable telephone system according to claim 17, wherein the base station selection portion selects a base station with which electromagnetic waves from the portable telephone can be received under the best conditions, irrespective of whether the base station is the compound device.

19. The portable telephone system according to claim 17, wherein the base station selection portion selects with priority a base station other than the compound device from the base stations capable of receiving electromagnetic waves from the portable telephone.

20. The portable telephone system according to claim 17, wherein a base station transfer request is output to the base station selection portion from the compound device when an input requesting that a compound device functioning as a base station for a portable telephone functions as the consumer information processing device is received, and
   wherein the base station selection portion transfers the base station for relaying communication between it and a portable telephone to a base station other than the compound device.

21. The portable telephone system according to claim 17, wherein the base station selection portion transfers the base station for relaying communication between it and a portable telephone to a base station other than the compound device, when the compound device is functioning as a base station for a portable telephone, and a request for communication with respect to a communications tool at the site where the compound device is installed and that is connected to the communications line is received.

22. The portable telephone system according to claim 17, wherein a base station transfer request is output to the base station selection portion from the compound device, when the compound device is functioning as a base station for a portable telephone, and a request for use of a communications tool at the site where the compound device is installed and that is connected to the communications line is received, and
   wherein the base station selection portion transfers the base station for relaying communication with a portable telephone to a base station other than the compound device.

23. A program for executing, on a computer of a telephone station connected to a plurality of base stations including a compound device according to claim 1 via a communications line, a base station selection process for selecting, from the plurality of base stations, a base station for relaying communication between it and a portable telephone designated as the party with which communication is to be established.

24. The program according to claim 23, wherein the base station selection process is a process for selecting the base station with which electromagnetic waves from the portable telephone can be received under the best conditions, irrespective of whether the base station is the compound device.

25. The program according to claim 23, wherein the base station selection process is a process for selecting with priority a base station other than the compound device from among the base stations capable of receiving electromagnetic waves from the portable telephone.

26. The program according to claim 23, wherein a process for transferring the base station for relaying communication between it and a portable telephone to a base station other than the compound device is executed when a base station transfer request is received from the compound device due to input requesting that a compound device functioning as the base station for a portable telephone functions as the consumer information processing device.

27. The program according to claim 23, wherein a process for transferring the base station for relaying communication between it and a portable telephone to a base station other than the compound device is executed, when the compound device is functioning as the base station of a portable telephone, and a request for communication with respect to a communications tool at the site where the compound device is installed and that is connected to the communications line is received.

28. The program according to claim 23, wherein a process for transferring the base station for relaying communication between it and a portable telephone to a base station other than the compound device is executed, when the compound device is functioning as the base station of a portable telephone, and a base station transfer request is received from the compound device due to a request for the use of a communications tool at the site where the compound device is installed and that is connected to the communications line.

29. A program for making a computer function as a compound device having a function for serving as an image processing device for digital television and a function for serving as a base station for portable telephones, wherein the computer is connected to an antenna device that converts electromagnetic waves for digital television into analog signals for digital television, converts electromagnetic waves for portable telephones into analog signals for portable telephones, and converts analog signals for portable telephones into electromagnetic waves for portable telephones, and is connected to a telephone station over a communications line, and the computer comprises:

a digital television program storage portion for storing a program for converting digital data for digital television converted by the analog signal processing portion for digital television into image data and sound data;

a portable telephone program storage portion for storing a program for converting digital signals for portable telephones converted by the analog signal processing portion for portable telephone base stations into portable telephone communication information and outputting to the communications line, and converting the portable telephone communication information input from the communications line into digital data for portable telephones and outputting to the analog signal processing portion for portable telephone base stations; and a digital data processing portion for processing digital data in accordance with the program that is read out;

wherein the computer is made to execute:

a digital television analog signal process for inputting analog signals for digital television from the antenna device and converting these into digital data for digital television;

a portable telephone base station analog signal process for converting analog signals for portable telephones converted by the antenna device into digital data for portable telephones, and for converting digital data for portable telephones into analog signals for portable telephones; and a selection process for selecting a program to be read out by the digital data processing portion from the program stored in the digital television program storage portion and the program stored in the portable telephone program storage portion.

30. The program according to claim 29, wherein the selection process selects the program stored in the portable telephone program storage portion as the program to be read out by the digital data processing portion in a case where output from the analog signal process for portable telephone base stations is a valid value.

31. The program according to claim 29, wherein the selection process is capable of executing the program stored in the digital television program storage portion and the program stored in the portable telephone program storage portion in parallel in the digital data processing portion.

32. The program according to claim 29, wherein the selection process selects the program stored in the portable telephone program storage portion as the program to be read out by the digital data processing portion in a case where the digital data for portable telephones are output to the digital data processing portion by the analog signal process for portable telephone base stations and only if the communications line is not in use by a communications tool other than the portable telephone.

33. The program according to claim 29, wherein the selection process selects the program stored in the portable telephone program storage portion as the program to be read out by the digital data processing portion in a case where the digital data for portable telephones are output to the digital data processing portion by the analog signal process for portable telephone base stations and only if the digital data processing portion is not executing the program stored in the digital television program storage portion.

34. The program according to claim 29, wherein a base station transfer request is output to the telephone station, when the digital data processing portion is executing the program stored in the portable telephone program storage portion, and an input requesting to execute the program stored in the digital television program storage portion is received.

35. The program according to claim 29, wherein a base station transfer request is output to the telephone station, when the digital data processing portion is executing the program stored in the portable telephone program storage portion, and a request for the use of a communications tool at the site where the compound device is installed and that is connected to the communications line is received.

36. The program according to claim 29, wherein the computer comprises a communication record portion for storing the communication records of the portable telephone; and wherein a process for sending the communication records recorded to communication record portion to the communications line is executed on the computer.

37. A method for providing mobile telephone service, the method comprising:

selling a compound device and an antenna to individual users of the compound device, the compound device having a consumer information processing device and a portable telephone base station device and the antenna receiving electromagnetic waves for the consumer information processing device and the portable telephone;

periodically receiving communication records from the compound device by a telephone station, the communications records indicate an amount of usage of the portable telephone base station device to connect portable telephone handsets to a telephone network;

determining a financial credit corresponding to the amount of usage of the portable telephone base station device to connect portable telephone handsets to a telephone network; and providing the financial credit to the individual user of the compound device.

38. The method according to claim 37, wherein the consumer information processing device comprises a digital television.

39. The method according to claim 37, wherein the portable telephone base station permits users of portable telephones within a proximity of the portable telephone base station to permit receipt of electromagnetic signals to establish a telephone call using a connection between the portable telephone base station and a telephone network.

40. The method according to claim 37, wherein the telephone station communicates with the portable telephone base station using a digital modem within the portable telephone base station.

41. The method according to claim 40, the communication records are transmitted as digital data between the portable telephone base station and the telephone station using the modem.

42. The method according to claim 37, wherein the financial credit is provided to the individual user as a credit applied to a utility bill.

43. The method according to claim 42, wherein the utility bill corresponds to a telephone bill.

44. The method according to claim 43, wherein the financial credit corresponds to the cost to the individual user for the use of the telephone network during a period of time corresponding to the amount of usage of the portable telephone base station device to connect portable telephone handsets to a telephone network.

45. The method according to claim 42, wherein the utility bill corresponds to a electric power bill.

46. The method according to claim 45, wherein the financial credit corresponds to the cost to the individual user for the use of the electric power during a period of time corresponding to the amount of usage of the portable telephone base station device to connect portable telephone handsets to a telephone network.

47. A method for inducing a sale of a compound device to an individual user, the compound device having a consumer information processing device and a portable telephone base station device and connecting to an antenna receiving electromagnetic waves for the consumer information processing device and the portable telephone, the method comprising:

instructing the individual user to connect the portable telephone base station to a telephone network;

periodically receiving communication records from the compound device by a telephone station, the communications records indicate an amount of usage of the portable telephone base station device to connect portable telephone handsets to a telephone network;

determining a financial credit corresponding to the amount of usage of the portable telephone base station device to connect portable telephone handsets to a telephone network; and providing the financial credit to the individual user of the compound device.

48. The method according to claim 47, wherein the consumer information processing device comprises a digital telephone.

49. The method according to claim 47, wherein the portable telephone base station permits users of portable telephones within a proximity of the portable telephone base station to permit receipt of electromagnetic signals to establish a telephone call using a connection between the portable telephone base station and a telephone network.

50. The method according to claim 47, wherein the telephone station communicates with the portable telephone base station using a digital modem within the portable telephone base station.

51. The method according to claim 50, the communication records are transmitted as digital data between the portable telephone base station and the telephone station using the modem.

52. The method according to claim 47, wherein the financial credit is provided to the individual user as a credit applied to a utility bill.

53. The method according to claim 52, wherein the utility bill corresponds to a telephone bill.

54. The method according to claim 53, wherein the financial credit corresponds to the cost to the individual user for the use of the telephone network during a period of time corresponding to the amount of usage of the portable telephone base station device to connect portable telephone handsets to a telephone network.

55. The method according to claim 52, wherein the utility bill corresponds to a electric power bill.

56. The method according to claim 55, wherein the financial credit corresponds to the cost to the individual user for the use of the electric power during a period of time corresponding to the amount of usage of the portable telephone base station device to connect portable telephone handsets to a telephone network.

* * * * *